United States Patent [19]

Orsburn et al.

[11] Patent Number: 4,876,589
[45] Date of Patent: Oct. 24, 1989

[54] PHASE RESPONSIVE COMPOSITE VIDEO SIGNAL CONTROL SYSTEM

[75] Inventors: Michael L. Orsburn, Cooper City; Robert L. Hemsky; Terry L. Tucker, both of Boca Raton; Robert E. Schwarz, North Dade; Craig F. Fearing, Hollywood, all of Fla.

[73] Assignee: Utah Scientific Advanced Development Center, Inc., Burlington, Mass.

[21] Appl. No.: 142,691

[22] Filed: Jan. 11, 1988

Related U.S. Application Data

[60] Division of Ser. No. 760,339, Jul. 29, 1985, which is a continuation-in-part of Ser. No. 604,845, Apr. 27, 1984, Pat. No. 4,642,682.

[51] Int. Cl.[4] ............................................. H04N 9/74
[52] U.S. Cl. ........................................ 358/22; 358/27; 358/28; 358/80
[58] Field of Search ..................... 358/22, 27, 28, 80

[56] References Cited

U.S. PATENT DOCUMENTS

| | | |
|---|---|---|
| 3,603,729 | 9/1971 | Sperber .................... 358/105 |
| 3,649,748 | 3/1972 | Knauer ...................... 358/22 |
| 3,772,465 | 11/1973 | Vlahos et al. .............. 358/22 |
| 3,787,611 | 1/1974 | Poetsch et al. ............. 358/28 |
| 4,149,185 | 4/1979 | Weinger ..................... 358/81 |
| 4,236,174 | 11/1980 | Gall ......................... 358/22 |
| 4,266,242 | 5/1981 | McCoy ...................... 358/22 |
| 4,307,962 | 12/1981 | Jung ......................... 358/80 |
| 4,357,624 | 11/1982 | Greenberg ................. 358/22 |
| 4,394,680 | 7/1983 | Watanabe ................... 358/22 |
| 4,396,939 | 8/1983 | Kitahama ................... 358/22 |
| 4,413,273 | 11/1983 | Wischermann .............. 358/22 |
| 4,484,187 | 11/1984 | Brown et al. ............... 340/703 |
| 4,500,919 | 2/1985 | Schreiber ................... 358/80 |
| 4,525,736 | 6/1985 | Korman ..................... 358/28 |
| 4,533,938 | 8/1985 | Hurst ........................ 358/27 |
| 4,642,682 | 2/1987 | Orsburn et al. ............. 358/28 |

FOREIGN PATENT DOCUMENTS 930749 5/1982 U.S.S.R. ...................... 358/22

OTHER PUBLICATIONS

Maxemchuk et al., Separation of NTSC Signals by Minimum Mean Square Error Filters and Adaptive Filters, IEEE Transactions on Communications, vol. COM-26, No. 5, May 1978, pp. 583-593.

Primary Examiner—John W. Shepperd
Attorney, Agent, or Firm—Jones, Askew & Lunsford

[57] ABSTRACT

Improvements in a phase responsive video parameter control system for correcting hue, saturation and luminance of a phase encoded composite video signal are disclosed. The system has a phase detector that detects which of a plurality of color intervals or hue bands the instantaneous signal falls in. Luminance, hue and saturation corrections for each band are applied to the uncorrected video. The improvements include correction signal selection circuit that select the correction signals twice per subcarrier cycle, a damping circuit that smooths the transition between two correction signals when the hue moves to a different color interval or band, and a phase shifter that allows the centers of the bands to be moved without changing the width of the band.

61 Claims, 11 Drawing Sheets

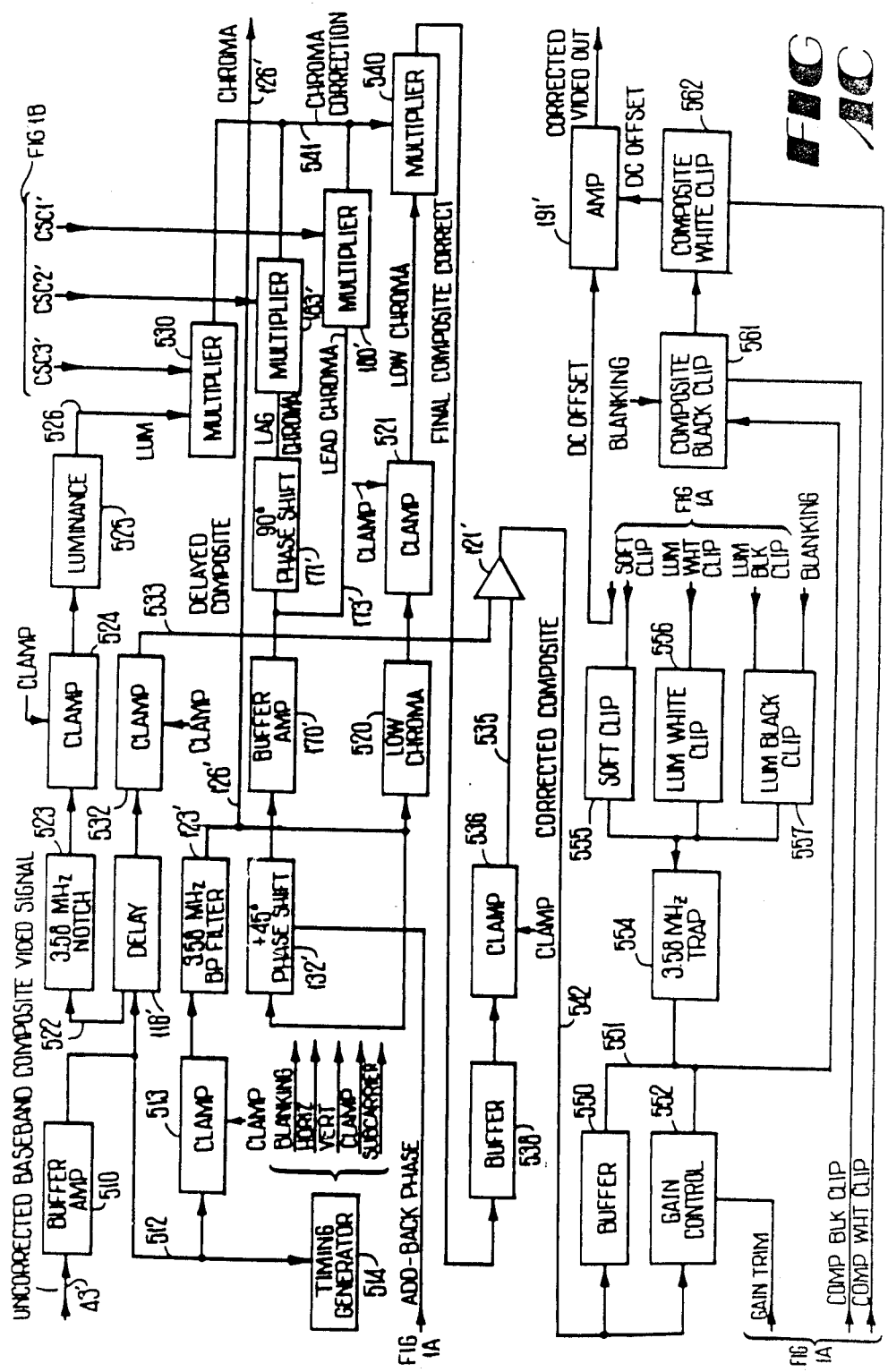

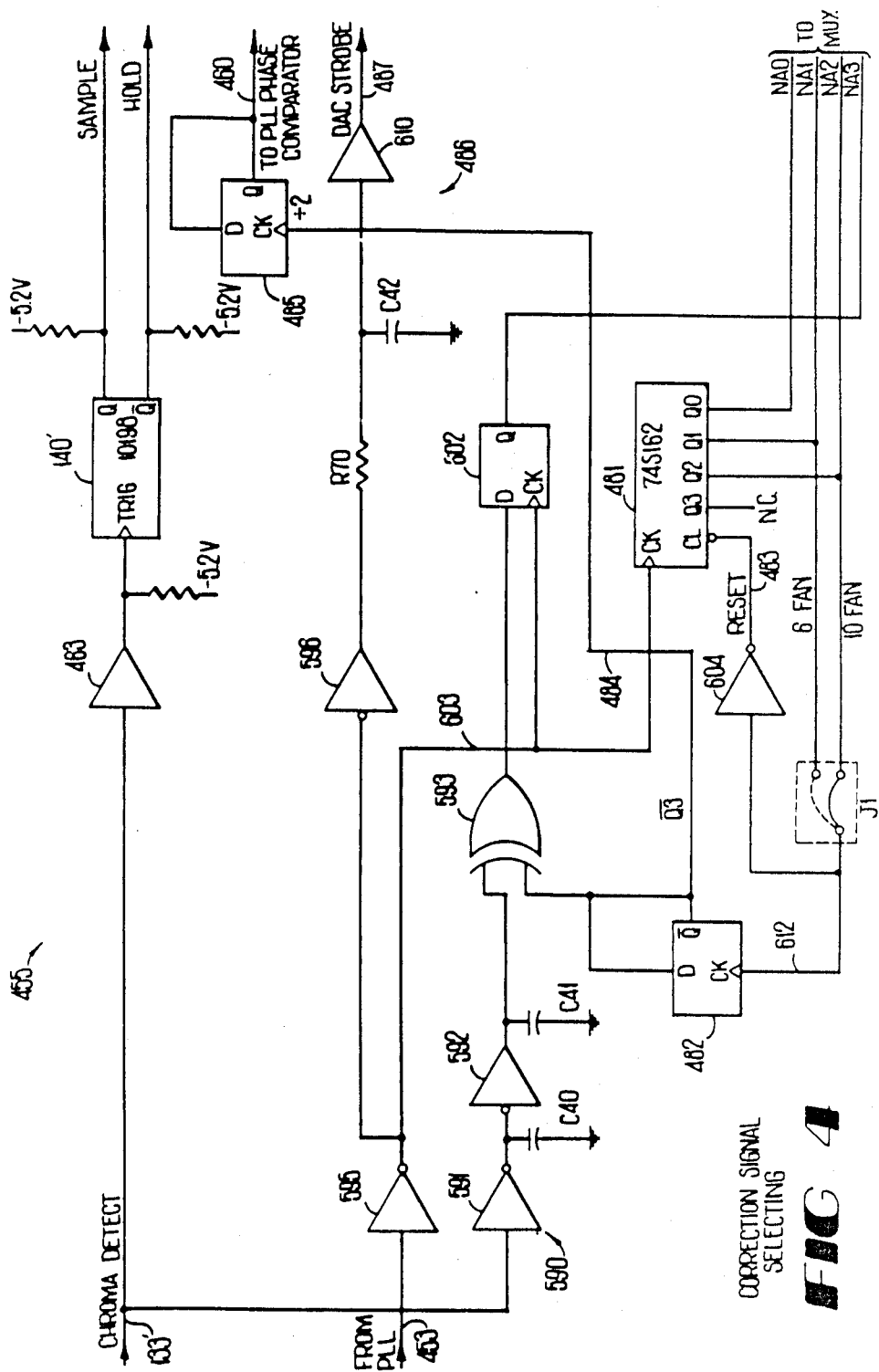
FIG 4 CORRECTION SIGNAL SELECTING

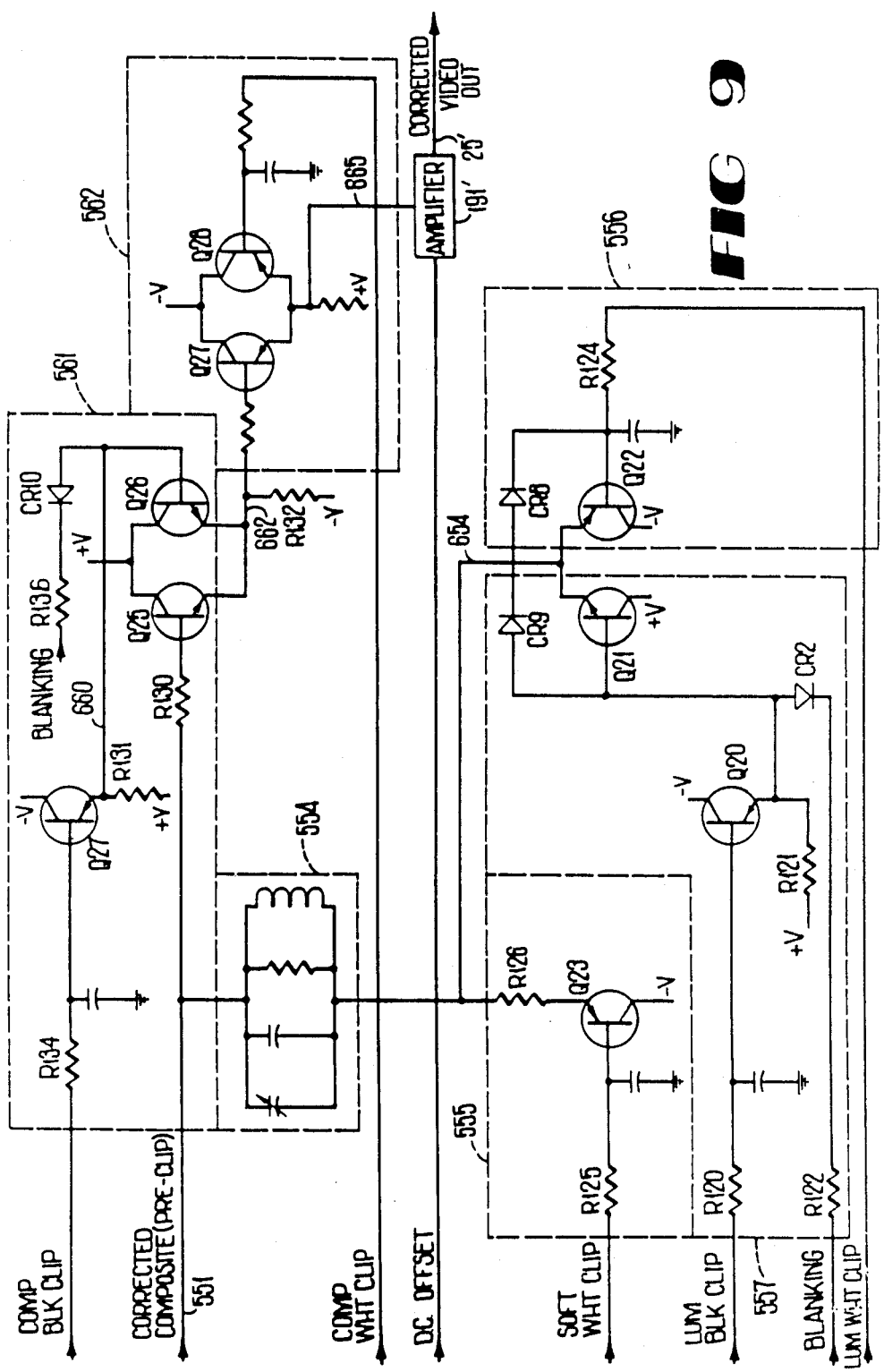

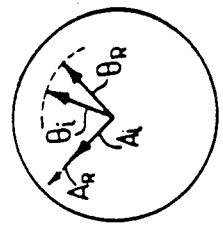
FIG. 11
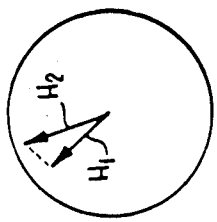
FIG. 12
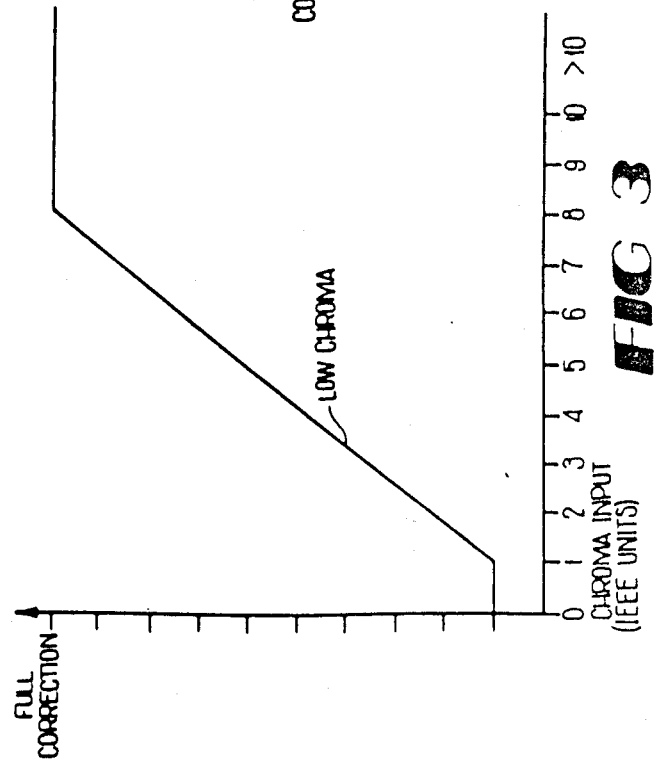
FIG. 10
FIG. 3

PHASE RESPONSIVE COMPOSITE VIDEO SIGNAL CONTROL SYSTEM

CROSS-REFERENCE TO RELATED APPLICATION

This is a divisional application of application Ser. No. 06/760,339, filed July 29, 1985, which is a continuation in part of application Ser. No. 604,845, filed Apr. 27, 1984, now U.S. Pat. No. 4,642,682.

TECHNICAL FIELD

The present invention relates generally to systems for the correction and control of video signals, and relates more particularly to a color video signal correction system which allows correction of the spectral distribution and luminance aspects of a phase-encoded video signal produced by a motion picture telecine, video tape reproducer or other video media.

BACKGROUND

Frequently in the television industry it is desirable to convert motion pictures or other image media such as video tape into video signals for recording or for transmission of the images to a viewing audience. Many technical problems are encountered in converting the motion picture images into video signals, including problems in the spectral response of the color dyes in the film, the characteristics of the telecine, and the fact that the characteristics of the photographic film are not matched to the electronic components used in the telecine or "film chain". Especially, problems are encountered in insuring that the spectral content of the resultant video signals are aesthetically acceptable and that the luminance or monochrome portion of the video signal provides an acceptable black and white image when reproduced on monochrome equipment.

One proposal for a color correction system for use in a film chain is shown in U.S. Pat. No. 4,096,523 to Belmares-Sarabia et al. In this system, color corrections are made in the video signals by adjusting the color hue and saturation, and by varying the proportions of the primary color video signals to form a composite luminance signal. The entire film is color-corrected by providing incremental adjustment signals which are added to or subtracted from standard values for each different scene in the film. The incremental adjustment values are stored in a computer memory associated with an event number, which is in turn associated with the count of the frame in the film at which the color correction was made.

After a series of color corrections have been made, a video tape recording of the color-corrected video signals is produced by re-running the motion picture film, video tape, or other video media through the system, while the color correction incremental adjustment signals are recalled from memory and added to the signals produced during the running of the film. The resultant color-corrected composite video signals are then recorded on the video tape recorder.

One problem with the system shown in U.S. Pat. No. 4,096,523 is that in creating the corrected video signals and the corrected composite luminance signal, control is provided only over the primary color video signals. Accordingly, if a spectral content correction or a luminance correction is effectuated by adjusting one of these primary video channels, any color mixtures in the video scene of which primary color video signals is a primary color component together with another primary color component, will also be affected.

For example, with respect to luminance correction, signals designated R, B, and G from the video pick-up devices are processed and provided to a luminance control circuit. For each of the processed signals, designated PR, PB, and PG, there is provided a video amplifier which is controlled by a DC signal from a remote luminance control potentiometer. A conventional luminance signal, developed by a resistor network in accordance with the NTSC standard luminance mixture in the proportion of 30% of red, 11% of blue, and 59% of green, is then modified by controlling the PR, PB, and PG video amplifiers. Accordingly, it is apparent that in this device the luminance potentiometers separately vary the total red signal in the red channel in order to vary the amount of the red signal away from the standard 30%. Similarly, other luminance potentiometers provide for adjustment of the green and blue channels.

Inasmuch as the total red channel in the apparatus shown in U.S. Pat. No. 4,096,523 is luminance controlled, it follows that any portions of a video picture containing red information will be affected in luminance by adjustment of the luminance potentiometer for the red channel. For example, in a video scene having a red soft drink cup, an orange fruit, and a teak desk, each of these objects will vary in luminance or brightness by adjusting the luminance potentiometer for the red channel, since each of the objects of the picture contains some red information. Adjusting the red luminance potentiometer to increase the amount of red in the overall luminance signal will make brighter any object in the scene which contains any red. The red cup will be most affected, since it is primarily red, while the orange and the teak desk will also be affected, although somewhat lesser, since these objects have colors which include red in some amounts as one of the primary color components.

Accordingly, if the control in the red channel is adjusted, the luminance of any object in the scene, the color of which includes red as one of the primary color components, will be altered. Neutral tones such as whites and grays will also be affected. It is therefore apparent that the color correction device shown in U.S. Pat. No. 4,096,523 undesirably affects the spectral content of neutral tones and color mixtures containing one of the primary colors as one of the color components, when the luminance of that particular primary color is adjusted.

One proposal for providing a greater control over video signals is shown in U.S. Pat. Nos. 3,558,806 to Monahan et al. and 4,410,908 to Belmares-Sarabia et al. In particular, the latter patent employs the circuitry of the former patent in order to obtain six independently variable primary and complementary color derivative signals (yellow, green, red, blue, cyan, and magenta), which are combined with one another to obtain a luminance compensation signal. In essence, these patents disclose color separator circuitry which is responsive to the primary color video signals to provide a plurality of independent color derivative signals, each of which is separately variable so as to provide control over parameters such as luminance, hue, or saturation. Each of the independent color derivative signals is present only when the video image color information is predominantly the color of the particular independent color video channel.

Present day users of video color correction equipment desire even greater precision and control over video parameters such as hue, saturation, and luminance than can be provided with the apparatus disclosed in the Monahan and Belmares-Sarabia patents. For example, consider extending the concept shown in these patents to provide for independently variable color derivative signals other than the six primary and complementary colors. For each additional color derivative signal, there will necessarily be required a separate additional color separator circuit responsive to predetermined proportions of signal information present in the primary video channels, so that the presence of color information predominantly the color of the separated color channel can be detected for purposes of exercising control. Accordingly, it is apparent that if control is desired over eight, or ten, or twelve different colors, as opposed to the six primary and complementary colors, there will be needed eight, or ten, or twelve additional channels for developing the independent color derivative signals.

Accordingly, there is a need for color video control circuitry which is able to detect and control parameters of color video signals without requiring a separate channel of circuitry for each color over which control is desired to be exercised.

SUMMARY OF THE INVENTION

The present invention overcomes certain disadvantages of the approach shown in the Monahan and Belmares-Sarabia patents by removing detection of the hues to be controlled from the domain of the primary color video signals to the phase domain. In particular, the control and correction of electrical parameters in a color correction system of the present invention is controlled by providing phase responsive circuitry which detects hue information in a phase-encoded composite color video signal.

Briefly described, the present invention comprises in a video color correction system, an improved circuit for correction and control of a video parameter of an image represented by a phase-encoded video signal. The disclosed embodiment includes phase detecting means which is responsive to detect relative phase between a component of an uncorrected phase-encoded color video signal, and the 3.58 MHz reference subcarrier signal. As known to those skilled in the art, the detected relative phase is indicative of the instantaneous hue of the image represented by the video signal. Circuitry responsive to the detected relative phase generates a correction signal related to the detected relative phase, and additional circuitry responsive to the correction signal provides for correction of the phase-encoded video signal so as to provide a corrected composite video signal which has been adjusted to reflect the desires of the operator.

More particularly described, the present invention provides an apparatus and method for controlling a video parameter of a portion of a video image represented by a phase-encoded video signal, where the controlled portion of the video image is at least partially defined by a predetermined hue. The system comprises circuitry for detecting the predetermined hue by detecting relative phase between the phase-encoded video signal and the subcarrier reference signal, and is responsive to provide a control signal related to the predetermined hue. Circuitry responsive to the control signal recalls from memory a particular prestored correction signal which is related to a predetermined desired value of the video parameter for that particular predetermined hue. The recalled correction signal is then employed to correct the video parameter to the desired value.

Video parameters over which control can be exercised include the hue and saturation of the detected portion of the video image, which are controlled by shifting the phase of the phase-encoded signal for controlling hue and modifying the amplitude for controlling saturation, so as to actually modify the phase-encoded video signal. Also controllable is the luminance of the video image represented in the composite color video signal, by altering the luminance portion of the composite video signal.

Accordingly, it is an object of the present invention to provide an improved system for correction and control of color video signals.

It is another object of the present invention to provide an improved luminance and spectral content correction circuit.

It is another object of the present invention to provide a color video correction and control system which is able to detect hue information of a video image with greater resolution than shown in the prior art.

It is another object of the present invention to provide a system for detecting a greater number of discrete hues in a video image than shown in the prior art, and with finer definition in the hues, and to effectuate control or correction of a video parameter such as hue, saturation, or luminance related to a particular detected hue.

It is another object of the present invention to provide a color video correction and control system which operates in the phase domain instead of the domain of the primary color video signals, thereby providing detection of a variable over which control is to be exercised with a single channel of circuitry, as opposed to multiple parallel channels of circuits as required in the prior art.

It is another object of the present invention to provide a color video correction and control system which is able to detect when the color information of a video image falls within a selectable color window or interval, and effectuates correction of a video parameter to a desired level pertaining to the particular detected color interval.

It is another object of the present invention to provide a color video correction and control system which is operative to detect when the color information of a video image falls within a selectable color window or interval and effectuates correction of a video parameter by recalling prestored correction values related to the detected color interval and imposing correction upon a composite video signal.

It is another object of the present invention to provide an improved color video correction and control system for controlling the hue, saturation, and luminance of a portion of a video image preparatory to broadcasting or recording the video signal representing the image.

It is another object of the present invention to provide a color video correction and control system which operates on a composite video signal as opposed to the primary color video signals, and thus can be retrofit to a wide variety of video equipment without the need for separately isolating the primary color video signals.

It another object of the present invention to provide an improved color video correction and control system wherein hue control is provided without altering saturation and saturation control is provided over a selected hue without affecting the hue.

It is another object of the present invention to provide an improved color video correction and control system wherein color correction is selectively reduced at low chroma levels.

It is another object of the present invention to provide an improved color video correction and control system which allows rapid selection between different sets of color corrections.

It is another object of the present invention to provide an improved color video correction and control system wherein a different correction value for a video signal can be selected within one cycle of the video signal subcarrier.

It is another object of the present invention to provide an improved color video correction and control system wherein color corrections for a video signal corresponding to one range of hues can be smoothly blended or transitioned into a correction for an adjacent range of hues to prevent color freckling or mottled colors in the color corrected output video image.

It is another object of the present invention to provide an improved color video correction and control system which provides selectively positionable color windows or intervals whose boundaries can be shifted on a vector scope or phase plot so that hues of interest close to a color window boundary can be shifted toward the center of a correction window to minimize discontinuous color correction.

It is another object of the present invention to provide an improved color video signal correction and control system wherein a number of different hues greater than presently available in the prior art can be selected for control.

It is another object of the present invention to provide an improved color video correction and control system which effectuates control by isolating and selecting a particular hue of interest, and effectuating control over portions of the video image containing the selected range of hues.

These and other objects, features and advantages of the present invention may be more clearly understood and appreciated from a review of the following detailed description of the disclosed embodiment and by reference to the appended drawings and claims.

BRIEF DESCRIPTION OF THE DRAWINGS

FIG. 3 illustrates the operation of the low chroma circuit, of FIG. 2.

FIG. 4 is a detailed schematic diagram of a portion of the correction signal selecting circuitry of the preferred embodiment of FIG. 1.

FIG. 9 is a detailed schematic diagram of the output clipping circuits employed in the preferred embodiment of FIG. 1.

FIG. 10 is a sample wave form diagram illustrating the effect of the shaping or damping circuitry employed in the preferred embodiment of FIG. 1.

FIGS. 11 and 12 are phase plot diagrams illustrating hue correction without affecting saturation and saturation correction without affecting hue.

DETAILED DESCRIPTION OF THE PREFERRED EMBODIMENT

Reference is made to the parent application of the present application Ser. No. 604,845, filed Apr. 27, 1984, now U.S. Pat. No. 4,642,682, assigned to the same assignee as the present invention, the disclosure of which is incorporated herein by reference and made a part hereof. This patent describes a phase responsive composite video signal correction or control system employed in connection with a conventional motion picture telecine.

Figure 1A:
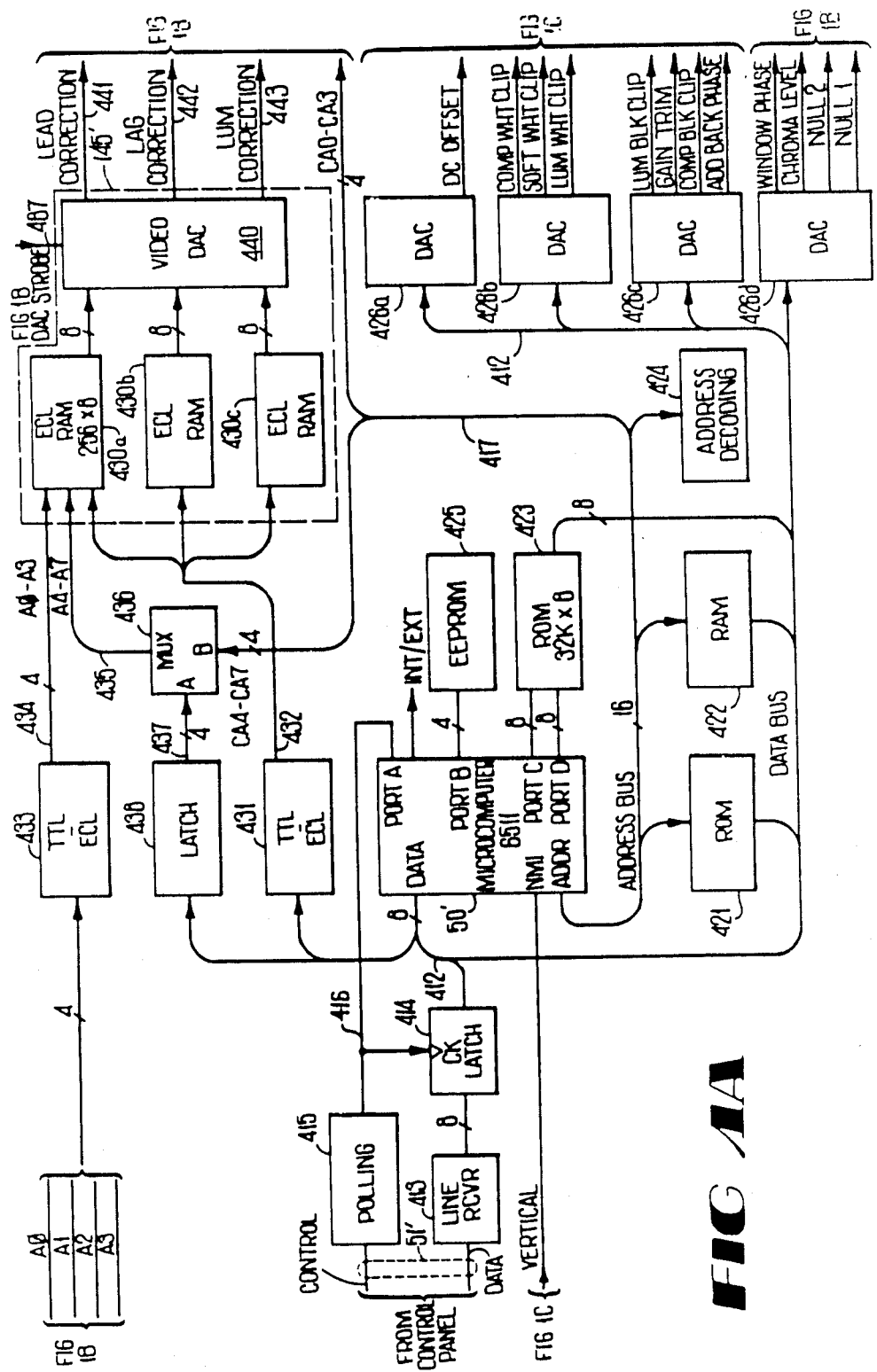
FIG. 1, consisting of FIGS. 1A through 1C, is a schematic block diagram of a second preferred embodiment of a color video correction and control system incorporating a preferred embodiment of the phase responsive composite video signal correction circuit according to the present invention.
Figure 1B:
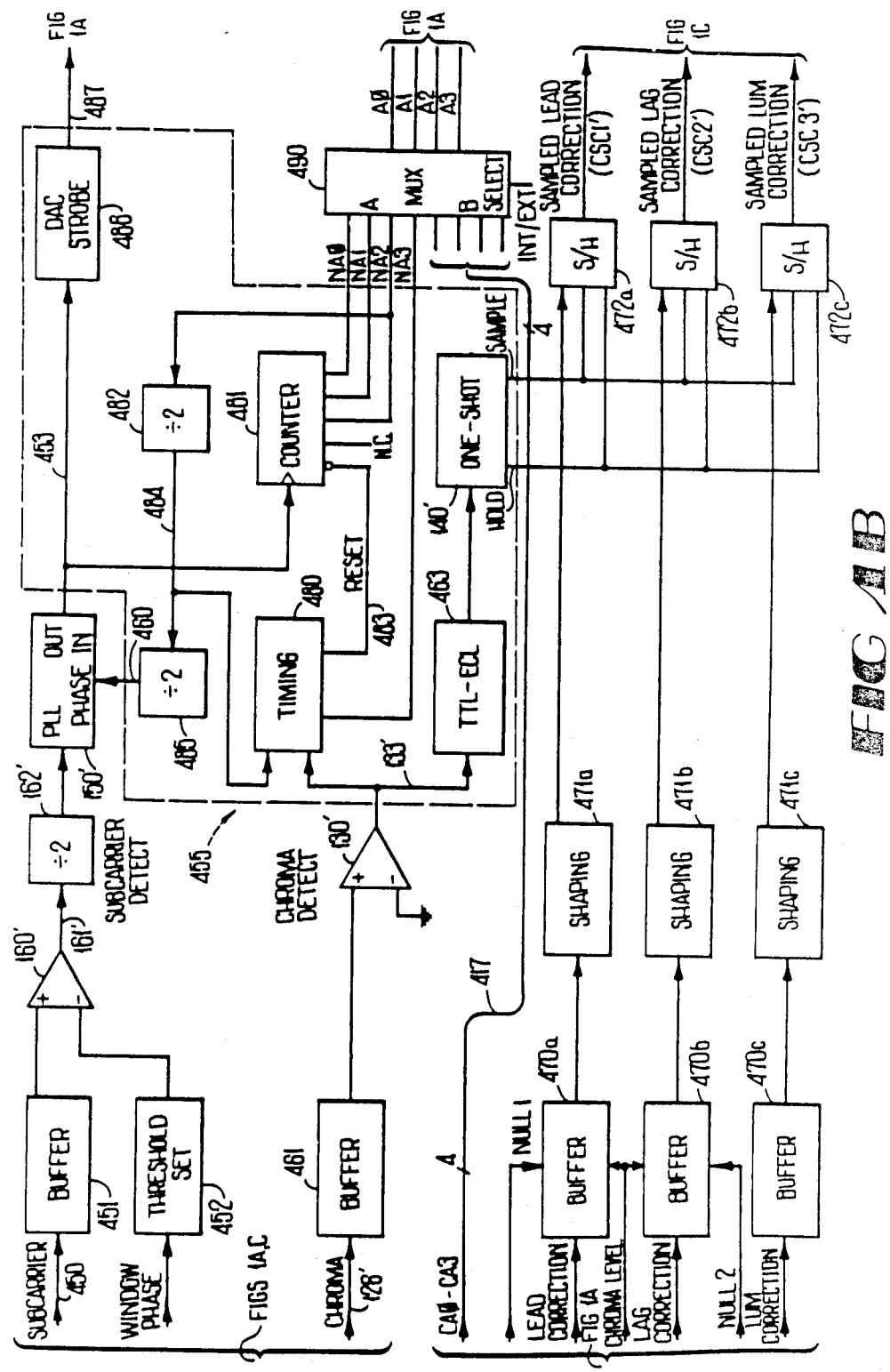

Turning now to FIG. 1, consisting of FIGS. 1A through 1C, there will now be described a preferred embodiment of a phase responsive composite video signal correction or control system 10'. The preferred embodiment to be described operates in a manner substantially similar to the foregoing described circuitry, in that the circuitry is responsive to detect the instantaneous hue of the video image, provide signals which select one of a plurality of color intervals or windows within which the detected instantaneous hue falls, impose, prestored correction values associated with the selected color interval, and convert the selected correction signals into signals which modify the phase, amplitude and luminance level of the composite video signal, to produce a color-corrected composite video signal.

The preferred embodiment, however, includes various features not present in the first preferred embodiment. For example, the preferred embodiment includes damping or shaping means for smoothing transitions between selected particular correction signals. Thereby, corrections for video signals which correspond to one interval or range of hues are blended over into corrections for an adjacent interval or range of hues. This prevents "color freckling", a phenomenon which manifests itself as mottled areas of different color on a supposedly uniformly colored area. Freckling can occur if a selected hue over which control is to be exercised falls close to a boundary between color intervals, and the relative amounts of correction between the two intervals widely differ, so that one hue which is close to another hue may receive a disproportionately large correction, causing that hue to stand out noticeably in the output image.

The preferred embodiment further includes band-selectable memory containing a variety of preset correction signals, and means for rapidly changing between prestored sets of correction signals. By addressing a portion of the correction signal memory with lower order addressing bits, and selecting between "banks"

within a memory circuit with a higher order address bit, rapid change between sets of correction values can be effectuated merely by changing one or more higher order address bits.

Another advantage offered by the preferred embodiment is that the apparatus is operative to effectuate a hue control without affecting the saturation of the selected hue, and to effectuate saturation control without changing the hue of the selected hue. This prevents problems which occur in many prior art systems, including matrix-type or color separator color correctors, wherein a saturation adjustment to one of the primary or complementary colors undesirably affects hue, since the saturation adjustment affects the intensity of the selected color component relative to other, unchanged components. In a similar manner, these prior art approaches include the undesirable result that altering the hue undesirably changes the saturation in other hues including the selected hue.

In the preferred embodiment described below, hue correction is effectuated by altering the phase angle without affecting the length of the phase vector, and in like manner saturation correction is effectuated by altering the length of a selected vector without altering the phase angle thereof. Constant-phase saturation control and constant-amplitude hue control are possible in both disclosed embodiments because the color correction occurs in the phase domain, according to the equations in the referenced parent patent relating to translation of control knob movement into control signals.

The preferred embodiment also includes circuitry for detecting when the chrominance level falls below a predetermined threshold magnitude, for gradually reducing color correction for signals below the threshold magnitude. This provides the advantage that color corrections at low chrominance levels are reduced corresponding to the chrominance level, since it is not desirable to have strong correction imposed on the output during low color levels, which can distort the appearance of the video image at low chroma levels.

The preferred embodiment of the present invention also includes circuitry for detecting the instantaneous hue twice per cycle of the chrominance signal, to provide more precision in detecting a color transition or boundary. Advantageously, the preferred embodiment is able to more precisely detect a color transition and select and impose a color correction as much as one half cycle earlier than in the embodiment disclosed above.

It will be understood from the discussion which follows that reference numerals followed by a "prime" correspond generally to like elements illustrated in the detailed description of the first preferred embodiment.

FIG. 1, consisting of FIGS. 1A through 1C, illustrates the preferred embodiment 10'. Turning to FIG. 1A, the preferred embodiment of the present invention is constructed around a microcomputer 50', which is programmed to be responsive to control signals provided from a control panel such as control panel 45 in FIG. 1B of the referenced parent patent, to convert control inputs into appropriate correction signals for storage in a correction signal memory, and to control various adjustments to the circuitry. The preferred microcomputer 50' for the embodiment is a type R6511AQ eight-bit microcomputer manufactured by Rockwell International, Electronic Devices Division, of Newport Beach, Calif. The preferred 6511 microcomputer includes four input/output ports, PORT-1–PORT4, an eight-bit bidirectional data bus 412, and a sixteen-bit address bus 417 comprising lines CA0–CA15. Details of the operation and internal structure of the 6511 are available in the literature provided by the manufacturer.

Control signals from the operator panel are provided on lines 51', and comprise CONTROL lines and eight bits of DATA, which are provided to a line receiver circuit 413. The preferred line receiver is a type MC3450 manufactured by Motorola. The outputs of line receiver 413 are provided to the inputs of a three-state latch circuit 414, the outputs of which are connected to the data bus 412 of the microcomputer 50'. A command to the microcomputer 50' is provided from an external source by signals on the CONTROL lines, which are provided to a polling circuit 415. The CONTROL signals cause the generation of a signal on line 416, which is connected to the clock (CK) input of latch 414 and strobes-in the data received from the line receiver 413, and also is provided to one of the inputs of PORT A of the microcomputer 50' to signal that the latch 414 contains a command. As will be understood by those skilled in the art, the microcomputer 50' is then operative to read the contents of the latch 414 over its data bus 412, and to interpret the command received.

In the preferred embodiment, commands are provided from the control panel, or from another external source, over the lines 51' in the following format. The CONTROL signals comprise two bits, which enable a selection of three different types of commands an address, data for a color correction, or an adjustment of a non-color dependent video parameter. The two-bit code signals the microcomputer that the data being received by the line receiver 413 is an address for a particular color window or interval (to select the particular window), data corresponding to the particular selected color window, or an adjustment or "tweak" for various adjustable parameters of the circuit which will be described below. Those skilled in the art will understand that the microcomputer 50' is programmed to respond to signals provided by the polling circuit 415 to accept the data being provided by the line receiver 413 and latch 414 to implement the appropriate window selection, or adjustment or tweak as appropriate.

The program for microcomputer 50' is contained in a read-only memory (ROM) 421, a type AM2716 4K×8 memory manufactured by Advanced Microdevices, Inc. of Sunnyvale, Calif. A static random access memory (RAM) 422, is provided for temporary data storage. The preferred RAM is a 2K×8 static RAM type 6116 manufactured by Hitachi America, Ltd. of San Jose, Calif. In the preferred embodiment, RAM 422 stores data that has been received over the lines 51' until the data can be transformed into correction values which are then loaded in high-speed memory, to be described below.

A 32K×8 read-only memory (ROM) 423 is addressed by PORTC and PORTD of microcomputer 50' and stores precalculated correction signals CSC1 and CSC2 for all possible combinations of a hue and saturation control for a given window, to effectuate constant-phase saturation control and constant-amplitude hue control, in a manner to be described below.

The preferred embodiment in FIG. 1A further includes address decoding circuitry 424 connected to the address bus 417 of the microcomputer 50'. The address decoding circuitry 424 operates in a manner known to those skilled in the art to decode particular addresses for enabling the various peripheral circuitry connected to the address and data buses. It will therefore be understood that the various circuits described as controlled by the microcomputer 50' are addressed and enabled under program control with appropriate signals from the address decoding circuit 424.

Among the peripheral circuitry controlled by the microcomputer 50' is a series of four digital-to-analog converters (DAC) 426a, 426b, 426c and 426d. Each of these DACs in the preferred embodiment is a type AD7226 quad eight-bit D/A converter, manufactured by Analog Devices, Inc. of Norwood, Mass. In the preferred embodiment, the DACs 426 provide a plurality of analog voltage levels as outputs which are employed to control various controllable parameters in the circuit. As shown in FIG. 1A, these parameters include a DC offset control line, a composite white clip control signal (COMP WHT CLIP), a control signal for white/black contrast (SOFT WHT CLIP), a luminance white clip control signal (LUM WHT CLIP), a luminance black clip control signal (LUM BLK CLIP), a GAIN TRIM control signal, a composite black clip control signal (COMP BLK CLIP), a control signal for adjusting the phase of the phase-shifting circuitry employed to create the quadrature-related control signals (ADD-BACK PHASE), a WINDOW PHASE control signal for adjusting the center point of the selected color window or interval, a CHROMA LEVEL control signal, and a pair of control signals NULL1 and NULL2 for adjusting the correction circuitry during setup. The function of these control signals will be described in greater detail below. An electrically-erasable programmable read-only memory (EEPROM) 425 is connected to PORTB of the microcomputer for storing preset or default values for these parameters.

The preferred embodiment employs high-speed emitter-coupled (ECL) RAMs 430a, 430b, and 430c for storage of digital correction signals, which are employed to color-correct an input composite video signal. The preferred ECL RAMs are type 10422 256×4 memories manufactured by Motorola, arranged as 256×8. Data for the ECL RAMs 430 are provided from the microcomputer 50' through a TTL to ECL converter circuit 431, which receives data from the data bus 412 and provides same on lines 432 to the RAMs 430.

The ECL RAMs 430 are addressed in the following manner. In normal operation, when corrections are being imposed to an input composite video signal, the ECL RAMs 430 are being addressed with lower order of significance address bits A0-A3, which are provided over address lines 434 from a TTL-to-ECL converter 433, to select one of sixteen possible locations. A generation of these address signals will be described in connection with FIG. 1B.

Selection of a particular grouping or "bank" of sixteen addressable locations is made with address lines A4-A7 on lines 435, which allows selection of one of sixteen possible banks. A latch circuit 438 holds bank selection data provided from the microcomputer over the data bus 412. A multiplexer 436 allows selection between the addresses stored in the latch 438 on the A inputs during normal operation, and four bits of the address bus 417 on the B inputs, CA4-CA7, when the information contained in the ECL RAMs is to be updated or revised. The microcomputer 50' controls the selection between the A and B inputs of multiplexer 436 by a select line (not shown) provided from the address decoder 424. When the ECL RAMs 430 are to be loaded with new information, the address lines CA4-CA7 are selected; on the other hand, when a different "bank" or group of correction signals is to be selected, data is provided to the latch 438 from the microcomputer 50' to provide an appropriate four-bit address.

It should now be understood that in normal operation ten correction signals, corresponding to the ten color intervals or windows in the disclosed embodiment, are repetitively provided from the ECL RAMs 430. Addressing ten locations in the ECL RAMs requires only the four lower order address bits A0-A3. However, the ECL RAMs 430 are of a size sufficient to hold a plurality of groups or sets of ten correction signals. Selection between these sets of correction signals is made with the higher order address bits A4-A7, stored in the latch 438. Accordingly, it will be appreciated that extremely rapid selection between different sets of correction signals is effectuated in the embodiment shown in FIG. 1A by merely changing one of the higher order address bits A4-A7. In the second preferred embodiment, as many as sixteen different sets of correction signals can be rapidly selected by merely changing the higher order address bits.

It will of course be understood that four bits being required to select ten different correction signals, with the disclosed embodiment up to sixteen different color windows can be selected, provided that the remaining circuitry is operated at a speed sufficient to detect sixteen different color windows.

The digital outputs of the ECL RAMs 430 are provided to the inputs of a video-speed digital to analog converter (DAC) 440, which converts the eight bits of digital data provided from the ECL RAMs into analog correction signals. In the preferred embodiment, the video DAC 440 is a type 888E triple-DAC manufactured by Intec Microcircuits of Santa Clara, Calif. In the embodiment disclosed in FIG. 1A, the correction signals from the DAC are a LEAD CORRECTION signal, a LAG CORRECTION signal and a LUMINANCE (LUM) CORRECTION signal, provided on lines 441, 442 and 443 respectively. The LEAD CORRECTION and LAG CORRECTION signals are employed to generate the correction signals CSC1' and CSC2', which correspond generally to the same denominated signals in the embodiment described in the referenced parent patent. The signals CSC1' and CSC2', as in the above embodiment, are correction factors used to modify the amplitudes of the two quadrature-related chrominance signals so as to obtain the desired resultant output video signal.

Figure 2:
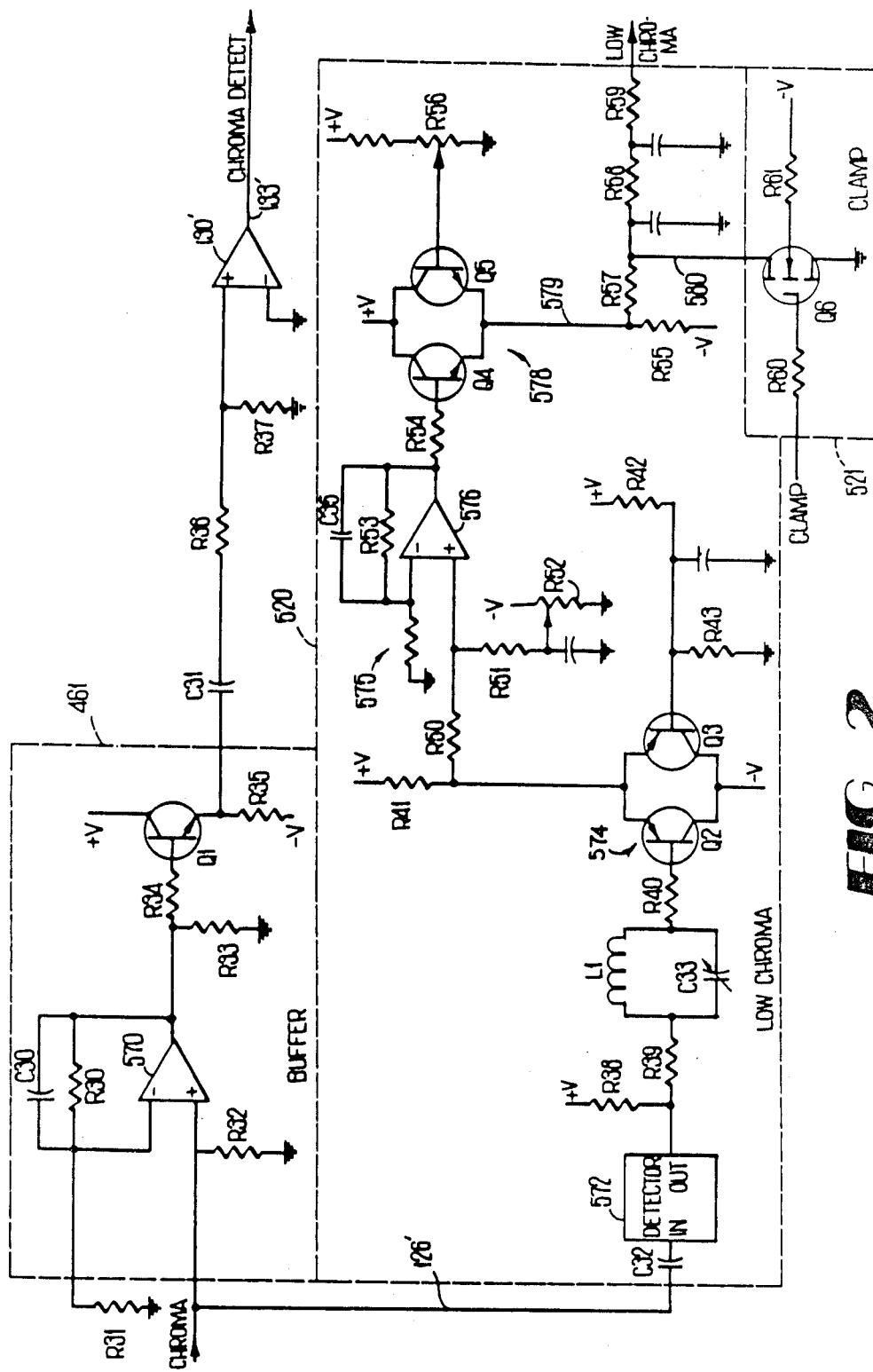
FIG. 2 is a detailed schematic diagram of the chroma detect and low chroma circuits employed in the preferred embodiment of FIG. 1.

The video DAC 440 and ECL RAMs 430 correspond generally to the RAM-LATCH-DAC 145 in the embodiment of FIG. 2 in the referenced parent patent.

Turning now to FIG. 1B, there will now be described additional circuitry in the preferred embodiment. As in the referenced parent patent, the preferred embodiment is responsive to detect relative phase between a phase-encoded video signal and the color subcarrier signal which serves as a phase reference. The SUBCARRIER signal is provided on line 450 to the input of a buffer amplifier 451 from circuitry in FIG. 1C. The output of the buffer 451 is connected to the non-inverting input of a comparator circuit 160', which corresponds generally to the comparator 160 in the embodiment shown in FIG. 2 of the referenced parent patent. The inverting input of comparator 160' is connected to the output of a threshold set circuit 452, which receives as its input the signal denominated WINDOW PHASE provided from the output of the DAC 426d. The WINDOW PHASE signal is a DC level which determines the voltage level against which the SUBCARRIER signal is compared to provide the output signal SUBCARRIER DETECT on line 161'. The SUBCARRIER DETECT signal occurs once per subcarrier cycle, and provides a phase reference. By adjusting the DC level at the inverting input to comparator 160' with the WINDOW PHASE signal, the effective phase reference provided by the SUBCARRIER signal can be adjusted.

Advantageously, adjustment of the reference phase by adjusting the detection threshold allows "shifting" of the center point of a selected color interval, thereby effectively moving color boundaries. It will be appreciated that shifting the time at which the SUBCARRIER signal occurs effectively changes the phase difference between the reference signal and CHROMA signal so as to cause a correction value to be imposed upon a slightly different hue.

The SUBCARRIER DETECT signal on line 161' is provided to a divide-by-two circuit 162', the output of which is provided to a phase lock loop (PLL) 150', which corresponds generally to the phase lock loop 150 shown in the embodiment of FIG. 2 of the referenced parent patent. In the preferred embodiment shown in FIG. 1B, the PLL 150' is a type NE564 manufactured by Signetics Corporation of Sunnyvale, Calif., which includes a VCO, limiter, phase comparator, and post detection processor. The PLL 150' is tuned with its tank circuit (not shown) to a frequency of 35.80 MHz, which is ten times the subcarrier frequency. The output OUT of the PLL 150' is provided on line 453 to a correction signal selection circuit 455, and receives from the correction signal selection circuit a signal on line 460 to the phase comparator input (PHASE IN).

The correction signal selection circuit 455 is responsive to the CHROMA signal, provided on line 126', to provide an address for the ECL RAMs 430 to select a particular correction signal stored therein. In addition, the circuit provides signals SAMPLE and HOLD to freeze the analog equivalent of a selected correction value for one-half subcarrier cycle. The CHROMA signal is provided through a buffer amplifier 461 to the non-inverting input of a comparator 130', which corresponds generally to comparator 130 shown in the embodiment of FIG. 2 of the referenced parent patent. The output of comparator 130' is the CHROMA DETECT signal, which provides a fifty percent duty cycle signal (except at phase changes) having sharp edges aligned with the zero crossings of the chrominance signal. The CHROMA DETECT signal is provided to the correction signal selection circuit 455 on line 133'.

The correction signals LEAD CORRECTION, LAG CORRECTION, and LUM CORRECTION are provided from circuitry in FIG. 1A through buffer amplifiers 470a, 470b, and 470c, through shaping or damping circuits 471a, 471b, 471c, to the inputs of sample-and-hold (S/H) circuits 472a, 472b, 472c, respectively. The shaping circuits 471 and sample-and-hold circuits 472 are described in more detail in connection with FIG. 6. The outputs of the sample-and-hold circuits 472a, 472b, 472c are designated SAMPLED LEAD CORRECTION (CSC1'), SAMPLED LAG CORRECTION (CSC2'), and SAMPLED LUM CORRECTION (CSC3'), which are provided twice per cycle of the CHROMA signal, as determined by the SAMPLE and HOLD originating from the correction signal selecting circuit 455.

Still referring to FIG. 1B, the CHROMA DETECT signal is provided to the correction signal selection circuit 455 to cause the selection of a particular correction signal stored in memory which corresponds to the instantaneous hue as represented by the CHROMA signal. The correction signal selection circuit 455 operates to synchronize itself with the SUBCARRIER signal, and to generate synchronized addresses on lines NA0-NA3, which form the address lines A0-A3 provided to the ECL RAMs 430a in FIG. 1A. A counter 481 is provided for cycling through the three lower order of significance bits NA0-NA2, and is clocked by the signal on line 453 from the output of the phase lock loop 150'. The output line NA2 of the counter 481 is provided to a divide-by-two circuit 482, which provides a signal on line 484 to the input of a timing circuit 480 and to a subsequent divide-by-two circuit 485. The divide-by-two circuit 485 provides a signal on line 460 to the phase comparator input of the PLL 150', as described above.

The timing circuit 480 operates to reset the counter 481 at least once each cycle of the subcarrier with the RESET signal on line 483. In the embodiment shown in FIG. 1B, and as will be described further in connection with FIG. 4, the counter 481 is reset twice per subcarrier cycle, in order to select the same correction value for the second half of the subcarrier cycle if no hue change has been detected, as indicated by the CHROMA DETECT signal. The timing circuit also provides address line NA3, described below in connection with FIG. 4.

The phase lock loop 150' output on line 453 is also provided to a DAC strobe circuit 486 which provides a signal on line 487 which strobes the digital values provided to the video DAC 440 (FIG. 1A).

The four address lines NA0-NA3 provided from the correction signal selecting circuit 455 serve as the "normal" address selection lines during operation of the circuitry. These address lines are provided to the A input of a multiplexer circuit 490. The B inputs of the multiplexer 490 are connected to the computer address lines CA0-CA3 from the address bus 417 of the microcomputer. The SELECT input of the multiplexer 490 is connected to a signal designated INT/EXT from PORTA of the microcomputer, which selects between "normal, internal" selection of values in the ECL RAMs 430, or an "external" mode wherein data values are to be loaded into the ECL RAMs. The outputs of the multiplexer 490 are the lines A0-A3, which are provided as the lower order address bits to the ECL RAMs 430, as discussed above in connection with FIG. 1A.

Turning now to FIG. 1C, there is illustrated the circuitry for imposing the correction signals CSC1', CSC2', CSC3' upon an uncorrected baseband composite video signal, to obtain a corrected video output signal. The uncorrected baseband composite video signal is provided on line 43', which corresponds generally to the line 43 shown in the embodiment of FIG. 2 of the referenced parent patent. The uncorrected composite video signal is applied on line 43' to the input of a buffer amplifier 510, the output of which is provided to a delay circuit 116', a clamping circuit 513, and a timing generator circuit 514. The timing generator circuit 514 is responsive to the input video signal to detect timing portions in the video signal corresponding to vertical and horizontal retrace, back porch (for clamping), blanking, and subcarrier. Accordingly, the signal outputs provided from the timing generator 514 are denominated BLANKING (which occurs during horizontal or vertical retrace), HORIZ (which occurs during horizontal retrace), VERTICAL (which occurs during vertical retrace or fly-back), CLAMP (which occurs during the back porch portion of the video signal), and SUBCARRIER (which is synchronized with the 3.58 MHz burst signal transmitted on the back porch of each horizontal blanking pulse, as is known to those skilled in the art). These signals are provided to various other portions in the circuitry, as will be described.

The output of the CLAMP circuit 513 is provided to a 3.58 MHz bandpass filter 123', which corresponds generally to the filter 123 in the embodiment of FIG. 2 of the referenced parent patent. The output of the filter on line 126' is the chrominance or CHROMA signal, and is provided to various other circuitry. The CHROMA signal is provided first to circuitry in FIG. 1B, where it results in the generation of the CHROMA DETECT signal. The CHROMA signal is also provided to the input of a 45° phase shift circuit 132', which corresponds generally to the phase shift circuit 132 shown in the embodiment of FIG. 2 of the referenced parent patent. The CHROMA signal is also provided to the input of a LOW CHROMA circuit 520 for determining when the magnitude of the CHROMA signal falls below a predetermined threshold, for selectively varying the correction at low chroma levels.

Referring back to the output of buffer amplifier 510, the amplified uncorrected composite video signal on line 512 is also provided to the input of a delay circuit 116', at about 40 nS, which corresponds generally to the delay line 116 in the embodiment of FIG. 2 of the referenced parent patent. One tap of the delay line 116' is provided on line 522 to a 3.58 MHz notch filter 523, to a CLAMP circuit 524, and thence to a LUMINANCE circuit 525 which provides a luminance output signal LUM on line 526. Those skilled in the art will understand that the LUM signal is the uncorrected video signal from which color information has been stripped. The LUM signal on line 526 is provided to a multiplier circuit 530, where it receives the correction signal CSC3' for generating a corrected luminance.

The output of delay line 116', after a delay of about 330 nS, is provided through a CLAMP circuit 532, the output of which is the DELAYED COMPOSITE signal, which is the uncorrected baseband composite video signal which has been delayed to allow for generation of correction values. The signal on line 533 is provided to the input of a combiner or mixer amplifier 121', which corresponds generally to mixer 121 in the embodiment of FIG. 2 of the referenced parent patent. The other input to the mixing amplifier 121' is received on line 535 from the output of a CLAMP circuit 536, which receives a signal denominated FINAL COMPOSITE CORRECTION on line 537, after a buffer amplifier stage 538. The FINAL COMPOSITE CORRECTION signal is the output of a multiplier circuit 540, which multiplicatively combines the signal LOW CHROMA from the LOW CHROMA circuit 520 and CHROMA CORRECTION signal on line 541. The CHROMA CORRECTION signal reflects the additively combined correction from the output of multiplier 530, and multipliers 180' and 183' (which correspond generally to the multipliers 180, 183 in the embodiment of FIG. 2 of the referenced parent patent). It will be understood from the discussion in connection with the embodiment described in the referenced parent patent above that the multiplier 180' receives a signal on line 173', denominated LEAD CHROMA from the output of an amplifier 170', which is the 45° phase shifted CHROMA signal, while the multiplier 183' receives a signal denominated LAG CHROMA from the output of a 90° phase shift circuit 171', which corresponds to the phase shift circuit 171 in the embodiment of FIG. 2 of the referenced parent patent. Multipliers 180', 183' receive correction signals CSC1' and CSC2'.

It will now be understood that the output of the mixer 121' is the corrected composite video signal, denominated CORRECTED COMPOSITE on line 542, which corresponds generally to the signal CORRECTED VIDEO OUT in the embodiment of FIG. 2 of the referenced parent patent. However, in the preferred embodiment of FIG. 1, the signal CORRECTED COMPOSITE is subjected to further signal processing prior to being provided as the CORRECTED VIDEO OUT signal on line 25'.

The CORRECTED COMPOSITE signal on line 542 is provided through a buffer amplifier 550 to a summing junction 551, and to a parallel GAIN CONTROL circuit 552, which receives the signal GAIN TRIM from the circuitry in FIG. 1A to trim the gain to a desired level; the buffer 550 provides unitary gain in the absence of any trim provided by the GAIN CONTROL circuit 552.

Also connected to the summing junction 551 is a 3.58 MHz trap filter 554, which filters out any undesirable near 3.58 MHz frequency components from a series of luminance clipping circuits 555, 556, 557. Connected to the input of the TRAP filter 554 is a SOFT CLIP circuit 555, a LUMINANCE WHT CLIP circuit 556, and a LUMINANCE BLK CLIP circuit 557. The inputs to these clipping circuits are designated SOFT CLIP, LUM WHT CLIP, and LUM BLK CLIP, DC control levels provided from the circuitry in FIG. 1A.

After luminance clipping, the CORRECTED COMPOSITE signal is subjected to composite black clipping by a composite black clip circuit 561, a composite white clip circuit 562, and then is provided to the input of a buffer amplifier 191', which corresponds generally to the buffer amplifier 191 in the embodiment of FIG. 2 of the referenced parent patent. The output of the buffer amplifier 191' is the CORRECTED VIDEO OUT signal provided on line 25'.

LOW CHROMA CIRCUIT

Turning now to FIG. 2, there will be next described the detail circuitry comprising the LOW CHROMA circuit 520 shown in FIG. 1C. As described above in connection with FIG. 1C, the output of 3.58 MHz bandpass filter 123' is the signal on line 126' denominated CHROMA, and is known to those skilled in the art as the "chrominance" signal. In FIG. 2, this signal is first provided to buffer circuit 461, which comprises a wide band operational amplifier 570 configured to provide gain of about 2 at 3.58 MHz with feedback network R30, R31. The preferred amplifier 570 is a type HA-5160 wideband uncompensated operational amplifier. Capacitor C30 is for amplifier compensation.

The output of the operational amplifier 570 is provided through load resistor R33 and input biasing resistor R34 to the base of an NPN transistor Q1 configured as an emitter follower. Transistor Q1 in the preferred embodiment is a type 2N3904, with the collector tied to the positive voltage rail and the emitter tied through load resistor R35 to the negative rail. The buffer circuit 461 causes the CHROMA signal to swing very close to zero volts baseline for purposes of the subsequent circuitry.

The output of the buffer circuit 461 is AC-coupled through capacitor C31 and voltage divider network R36, R37 to the positive input of comparator circuit 130'. The negative input to the comparator is referenced to ground, so that the CHROMA DETECT signal makes a sharp, positive transition when the input exceeds zero volts and makes a sharp negative transition when the input falls below zero volts.

The CHROMA signal on line 126' is also provided to LOW CHROMA circuit 520. The LOW CHROMA circuit produces an output signal LOW CHROMA which varies with the magnitude of the envelope of the chrominance signal; this signal is used to proportionally reduce color correction when the chrominance level falls below a predetermined magnitude. The CHROMA signal is AC-coupled through a capacitor C32 to the input IN of a video detector circuit 572. The preferred video detector is a type MC1330P low-level video detector manufactured by Motorola, which produces an output voltage on its output OUT which varies with the magnitude of the 3.58 MHz envelope. The output of the detector is pulled up to the positive power supply through R38 and then provided through resistor R39 to a 7 MHz trap filter comprising a coil L1 and variable capacitor C31 in parallel. The trap filter rejects undesirable frequencies near 7 MHz (twice subcarrier) generated by the low level detector, which essentially operates in a manner similar to a full-wave rectifier.

After the trap filter, the signal is provided through input biasing resistor R40 to a positive clipping circuit 574, comprising PNP transistors Q2, Q3 whose collectors are tied in parallel to the negative rail and whose emitters are tied in parallel through resistor R41 to the positive rail. Transistors Q2, Q3 are both type 2N3906. The base of transistor Q3 is biased through voltage divider resistors R42, R43 to provide a preset clipping level. The positive clipping circuit 574 accordingly sets an upper limit for the output of the low chroma circuit, which corresponds to "full correction". Those skilled in the art will recall that IRE units are commonly employed to refer to various signal levels in video circuitry, and that 140 IRE units correspond to one volt. Resistors R42, R43 are chosen so that signal levels above 8 IRE units allow full correction generated by the correction circuitry to be imposed upon the input video signal as illustrated in FIG. 3. At input signal levels below 8 IRE units, correction is reduced proportionally.

The common collectors of transistors Q2, Q3 are then provided to a gain stage 575 for further amplification. Gain stage 575 comprises input resistor divider R50, R51, R52, connected to the non-inverting input of a wideband operational amplifier 576. Amplifier 576 is a type HA-5160. Resistor R52 is preferably a potentiometer to allow adjustment of the DC input level. The feedback network for amplifier 576, comprising resistor R53 and capacitor C35, is selected to provide a gain of about 3, with a rapid roll-off above 3.58 MHz.

The output of amplifier 576 is provided through a resistor R54 to a negative clipping circuit 578, comprising NPN transistors Q4, Q5 whose collectors are tied in parallel to the positive power supply and whose emitters are tied through resistor R55 to the negative power supply. The input to the negative clipping circuit 578 is provided through R54 to the base of Q4, while the base of Q5 receives its bias voltage through a potentiometer R56, which allows selection of the negative clipping level. Preferably, R56 is set to prevent the output of the low chroma circuit from falling below 1 IRE unit as the smallest output, as illustrated in FIG. 3. The common collectors of transistors Q4, Q5 are then provided on line 579 through resistors R57, R58, R59 as the LOW CHROMA signal.

A clamping circuit 521 is connected between resistors R57 and R58 for clamping the output signal to ground during the presence of the CLAMP signal, which it will be recalled occurs during the color burst. The CLAMP circuit, which is employed in various locations throughout the preferred embodiment, comprises a base resistor R60 for coupling the CLAMP signal to the gate of an N-channel FET Q6, whose drain is connected on line 580 to the signal channel, whose source is grounded, and whose substrate is tied to the negative voltage supply through a resistor R61. The preferred FET is a type SD211 N-channel DMOSFET manufactured by Siliconix, Inc. of Santa Clara, Calif. Those skilled in the art will understand that the CLAMP signal effectively clamps the signal at point 580 to 0.00 volts or ground potential, preventing any signal from occurring on the output of the LOW CHROMA circuit 520.

As illustrated in FIG. 3, the LOW CHROMA signal is a signal which varies proportionally to the chroma input level between 1 and 8 IRE units, whereafter a full correction is allowed for the output signal. It will thus be appreciated that the detection of chroma levels below 8 IRE units causes a proportional reduction of correction, as will be more fully described in connection with FIG. 8.

CORRECTION SIGNAL SELECTION

Turning now to FIG. 4, next will be described the operation and structure of the correction signal selecting circuitry 455 generally illustrated in FIG. 1B. The correction signal selection circuit operates to select a particular correction signal as a function of the relative phase between the chrominance signal, as manifested by the CHROMA DETECT signal, and subcarrier, as manifested by the operation of the phase lock loop circuit 150'. The primary input therefore to the correction signal selection circuit 455 is the CHROMA DETECT signal provided on line 133', which is provided to a TTL-to-ECL converter circuit 463, and to the input of a delay circuit 590, comprising a pair of series-connected inverters 591, 592 and capacitors C40, C41. The output of inverter 592 is provided to the input of an exclusive OR-gate (XOR) 593, which serves a complementing function as will be described.

The CHROMA DETECT signal on line 133' is also provided to a TTL-to-ECL converter circuit 463 for triggering a one-shot circuit 140'. The one-shot circuit 140' corresponds generally to the one-shot circuit 140 shown in the embodiment of FIG. 2 of the referenced parent patent, except that the pulse output samples analog correction signals instead of selecting a digital correction signal. The one-shot 140' in the preferred embodiment is a type MC10198 ECL monostable multivibrator configured to trigger both on the rising and the falling edge of the CHROMA DETECT signal, to provide a ten nanosecond (nS) pulse. The outputs Q and Q̄ of the one-shot 140' are designated as a SAMPLE and HOLD signal respectively, which cause the sampling and holding of the analog correction signals LEAD CORRECTION, LAG CORRECTION, and LUM CORRECTION.

The primary input from the phase lock loop 150' is received on line 453 and provided through inverter 595 on line 603 to the clock (CK) input of a D-type flip-flop 602, the Q-output of which provides the address line NA3. Line 603 is also connected to the input of an inverter 596.

The output of inverter 596 is provided through an RC delay network comprising resistor R70 and capacitor C41 to the input of a TTL-to-ECL converter 610 so that an appropriate ECL-compatible signal DAC STROBE on line 487 may be provided to strobe the digital correction signals being provided by the ECL RAM into the video DAC.

The output of inverter 595, in addition to being connected to inverter 596, is provided on line 603 to the clock (CK) input of counter 481. The preferred counter is a type 74S162 high-speed counter manufactured by Texas Instruments having a synchronous reset or clear (CL) input. As will be apparent from an inspection of FIG. 4, the counter 481 changes states on each transition occurring on line 603, which occurs as a direct function of the phase lock loop output. Moreover, the counter is synchronously reset to the zero state upon the concurrence of the RESET signal on line 483, synchronously with the CK signal on line 603.

The Q0, Q1, Q2 outputs of the counter 481 directly correspond to the normal-operation address lines NA0, NA1, NA2 respectively, which select particular ones of the correction signals stored in the ECL RAM. The Q2 output is also provided through a jumper J1 to line 612, and through inverter 604 to form the RESET signal. Those skilled in the art will appreciate that the Q2 output represents the "4" state of the counter, which causes the counter to reset to the zero state on the next clock transition. Accordingly, it will be appreciated that with the circuitry as configured with the jumper J1 as shown in FIG. 4, counter 481 repetitively cycles through the states 0, 1, 2, 3, 4. Each of these five states corresponds to half of the states required to implement a ten window color corrector. It will be further understood that the jumper J1 may be configured as a conventional six-window color corrector by disconnecting the illustrated connection in jumper J1 and connecting the line shown in dotted relief, which will cause the counter to repetitively cycle through the states 0, 1, 2. It will still further be appreciated that the counter can be configured to count to 16 to provide up to 16 windows by modifying the jumper connections and detecting more states of the counter.

The remaining bit of the four-bit address required to select a color window, the NA3 bit, is generated in the following manner. The selected count of the counter 481 which generates the RESET pulse provided on line 612 is connected to the input of a divide-by-two circuit 482, which in the preferred embodiment is a D-type flip-flop with the negated-Q output on line 484 connected back to the D input. Essentially, the signal on line 484 corresponds to the Q3 count of counter 481. The signal on line 484 is connected to the remaining input of XOR-gate 593, as well as to the clock (CK) of divide-by-two circuit 485, which provides a signal on line 460 to the phase comparator of the phase lock loop.

The function of XOR-gate 593 is to complement the count Q3 on line 484 so long as the same hue is occurring, as indicated by the CHROMA DETECT signal. Stated in other words, the address lines NA0–NA3 select a particular correction signal during half of the subcarrier cycle (the first five of the ten possible color windows), and select the same correction the second half of the subcarrier cycle, provided that the hue in the video image has not changed. Stated still somewhat differently, in the event that a color change occurs in the second half of a subcarrier cycle, as represented by phase change in the chrominance signal, the CHROMA DETECT signal will cause the XOR-gate 593 to change the state of the NA3 address line, there fore effectively providing a different count to select a different correction signal.

Figure 5:
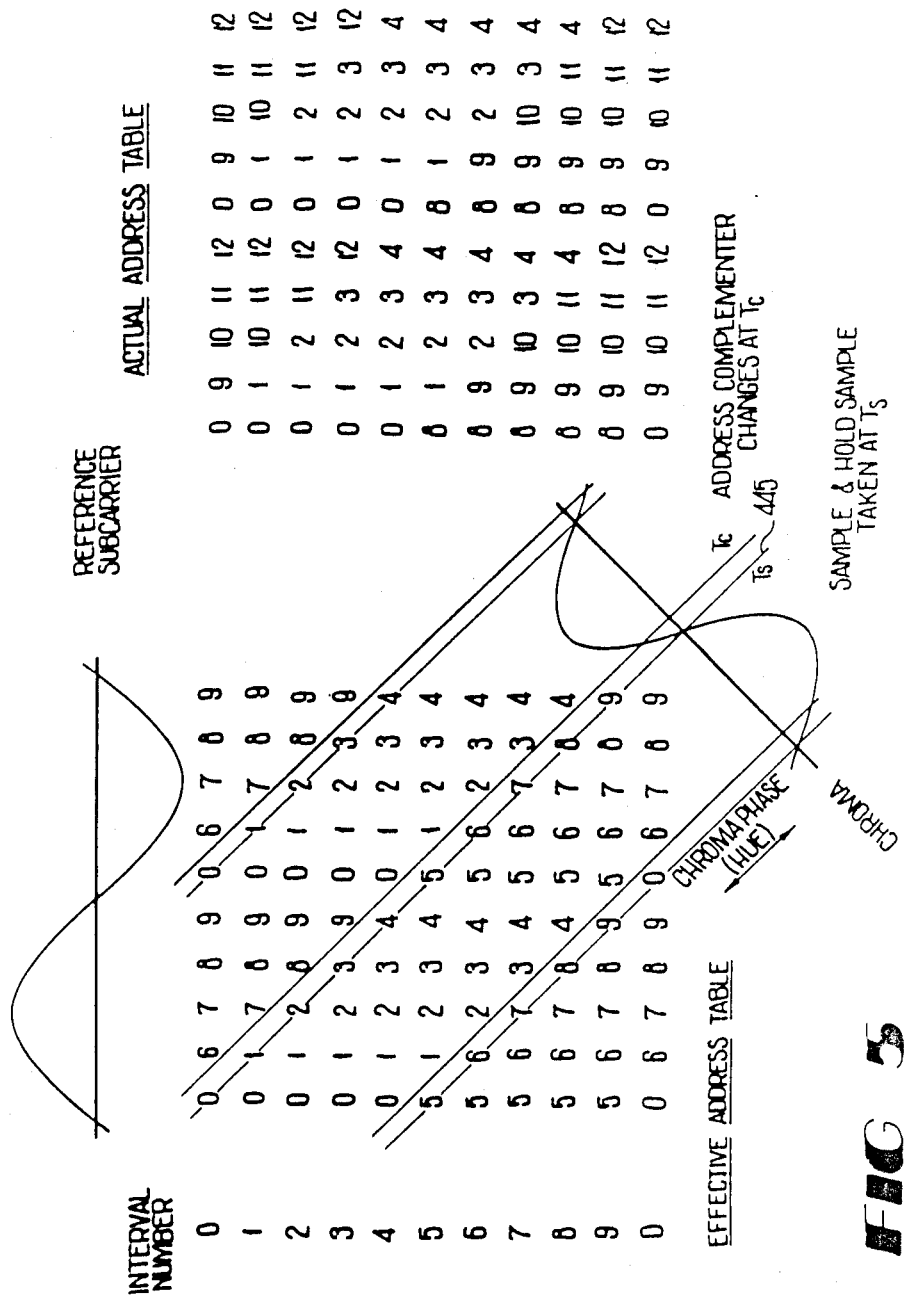
FIG. 5 is a timing diagram illustrating the operation of the correction signal selecting circuitry of FIG. 4.

In order to more fully illustrate this operation, reference is now made to FIG. 5. The CHROMA signal is illustrated, together with the subcarrier reference signal, in a format which associates each of the possible ten color intervals with an address count sequence for the ECL RAMs. It will be understood that the CHROMA DETECT signal occurs as a function of the zero crossings of the CHROMA signal, as a fifty percent duty cycle square wave having edges aligned with the zero crossings of the CHROMA signal.

FIG. 5 illustrates in tabular form the sequences of "effective" and "actual" addresses for a hue falling within each of the ten intervals in the disclosed embodiment. "Effective" addresses are the logical addresses of the correction signals, which correspond directly to the ten color fans or intervals of the disclosed embodiment. For example, it will be noted that there are ten sets or sequences of effective addresses in FIG. 5, and that for each fan, an effective address occurs twice per sequence. "Actual" addresses are the physical addresses for the ECL RAM represented by address lines NA0–NA3.

In FIG. 5, an effective address is selected by the zero crossings of the CHROMA signal, which can occur in any of the ten fans. The tables relate the selected effective address to an actual address. The effective address is selected by noting the interval number associated with the intersection of the diagonal line 445 with the effective address table. The diagonal line 445 relates the zero crossings of CHROMA to the subcarrier reference, and thus to the effective address. For example, if the hue to be corrected falls within interval 6, the effective address sequence is 5,6,2,3,4,5,6,2,3,4, and the actual address generated for the ECL RAM is 8,9,2,3,4,8,9,2,3,4. For correction signal sampling, a sample of the DAC output is taken at time $T_s$ (the "sample time" or zero crossing of the CHROMA signal), while the complementing of the D input to flip-flop 602 by XOR gate 593 occurs at time $T_c$.

At the outset, it should be understood that the goal of the correction signal selecting circuit is to provide the proper correction signal at the proper time. To accomplish this goal, there must be provided a correct address to the ECL RAM's 430 and time for the output data to settle. Then, the internal latches in the video DAC's 440 must be strobed to update them to the new data. Thereafter, the sample and hold circuits 472 can take a meaningful sample of the correction if the CHROMA signal has a zero crossing during the current window (i.e., prior to the next address for the ECL RAMs). If there occurs such a zero crossing, the count sequence of the ECL RAM address must be modified to select the same correction one-half cycle later when the CHROMA signal has another zero crossing. Unmodified, the effective address count sequence is 0,1,2,3,4,5,6,7,8,9 for a ten-window system.

Counter 481 in FIG. 4 provides a count sequence of 0,1,2,3,4, while divide-by-two stage 482 provides negated-Q3, which changes to its opposite state each pass through the sequence. This action provides for the effective count sequence 0,1,2,3,4,5,6,7,8,9, but an actual count sequence of 0,1,2,3,4,8,9,10,11,12.

First, assume that the signal on line 453 from the PLL (which may also be referred to as the "fan clock") has just clocked the counter 481 to its zero count, and that flip-flop 602 is in its reset condition (i.e., the line NA3 is a zero), such that address lines NA0-NA3 form an actual address 0. Note that the fan clock is delayed by inverter 596, RC network R70-C42, and TTL-ECL converter 610, so that the data outputs from the ECL RAM will be stable by the time that the DAC STROBE signal occurs, on line 487.

Further assume that the CHROMA DETECT signal on line 133' goes positive, indicating a positive-going zero crossing. One-shot 140' will thereby be triggered, to cause a sample to be taken of the DAC output. Slightly later, after a delay imposed by inverter 591, capacitor C40, inverter 592, and capacitor C41, the output of XOR gate 593 will be forced high, causing the D input to flip-flop 602 to be high. Thus, at the next fan clock on line 603, the Q output, NA3, of the flip-flop 602 will go high. Accordingly, the actual address provided by the address lines NA will be decimal 9 instead of decimal 1, which would normally be expected to follow zero.

Succeeding fan clocks continue to increment counter 481, causing the count (actual address) to proceed to 10,11,12. These actual addresses correspond to logical or effective addresses 6,7,8,9. After actual address decimal 12, NA3 changes state, causing the next address to return to zero (assuming that CHROMA DETECT is still high). Provided that CHROMA DETECT remains high, the XOR gate 593 will provide a low to the D input of the flip-flop 602. Therefore, the fan clock after count 9 (effective; actual address 12) resets counter 481 and clocks the low through flip-flop 602 to line NA3.

It will now be appreciated that each fan clock pulse results in a new address on the lines NA for the ECL RAM's, followed by the DAC STROBE signal to produce a new analog correction signal output from the DAC, all of which are ignored by the sample-and-hold circuitry so long as no zero crossings of CHROMA DETECT occur. Note that one-half cycle after the sequence just described, the count returns to effective (and actual) address 0, and the negative-going zero crossing of CHROMA DETECT is expected. Since fan 0 is occurring again, another sample of the DAC output is taken.

Note further that if a phase (hue) change had occurred during the previous half cycle so that the negative-going crossing of CHROMA DETECT occurs earlier than expected, a sample would be taken of logical address 9 (actual address 12), which would be the proper correction signal for a hue falling in the interval preceding interval 0. Likewise, if a hue change occurred later than expected, the count sequence would still be appropriate, causing selection of the correction value for the interval following interval 0, at effective address 6 (i.e. actual address 9). In order to "miss" the selection of the proper correction value, a hue shift of greater than about 180 degrees would have to occur, which is not possible within a half cycle.

Accordingly, it will be understood that the correction signal selecting circuitry illustrated in FIG. 4 is operative to select a particular correction signal twice during each cycle of the CHROMA signal, which is converted into an analog correction value by subsequent circuitry. It will be further understood that a selected correction signal will repeatedly occur twice each cycle until a color change occurs as shown in FIG. 5, whereafter a different correction stored in the ECL RAM will be selected and then provided in like manner twice each cycle of the CHROMA signal.

SHAPING AND CORRECTION SIGNAL SAMPLING

Figure 6:
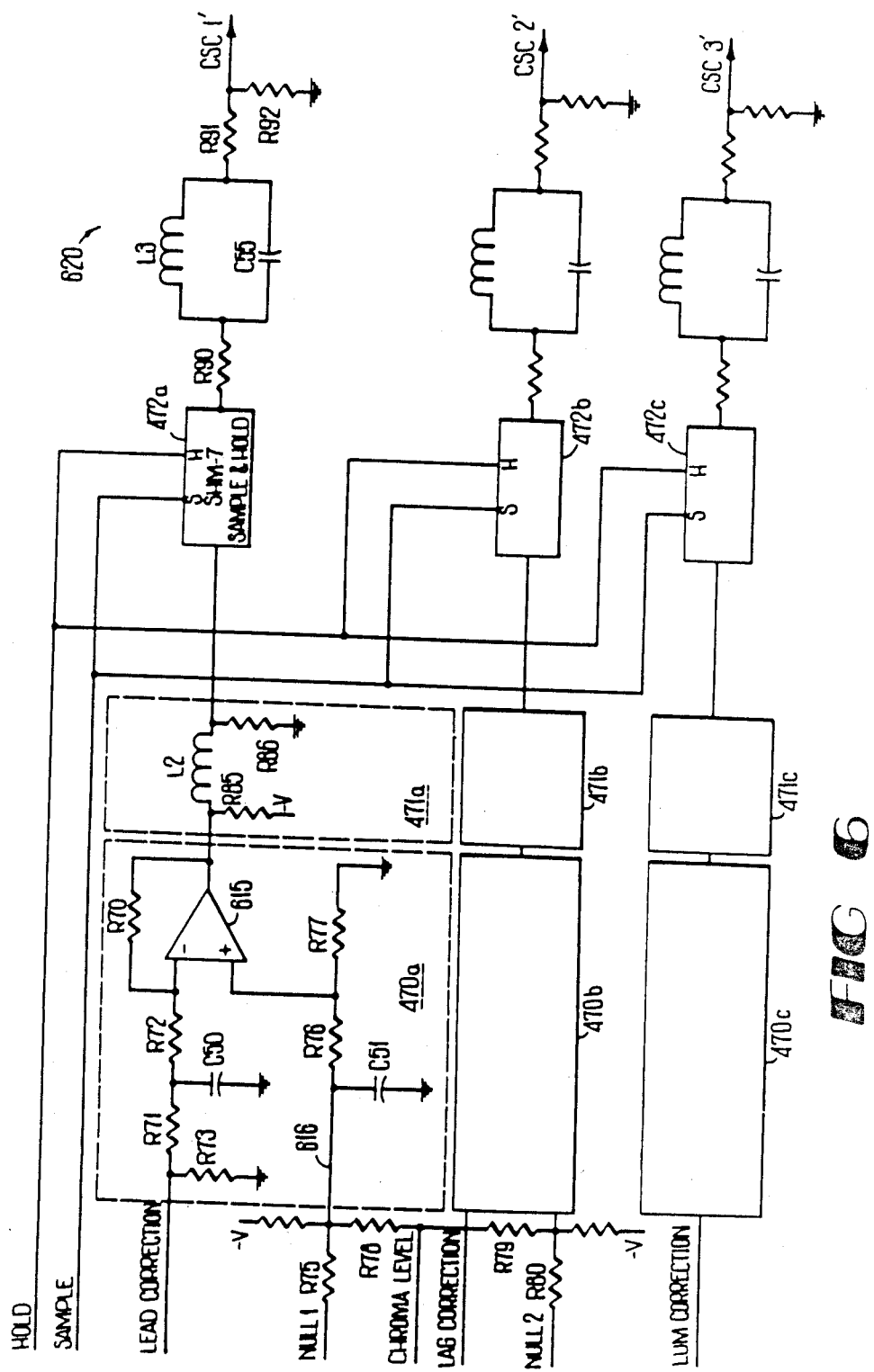
FIG. 6 is a detailed schematic diagram of the damping or shaping circuitry and sample-and-hold circuitry employed in the preferred embodiment of FIG. 1.

FIG. 6 illustrates in detail the buffer amplifiers 470, shaping circuitry 471 and sample-and-hold circuits 472 shown in FIG. 1B. Each of the buffer amplifiers 470 comprises an operational amplifier configured to provide a gain of about 8 with feedback resistor R70 and input resistors R71, R72. Resistor R73 is a load resistor for the output of the video DAC 440.

The non-inverting input to the amplifier 615 is connected to a nulling network which allows adjustment of the output of the amplifier 615 to zero volts when the LEAD CORRECTION signal is zero volts. A DC control signal NULL1 is provided from the DAC 426d shown in FIG. 1A through resistor R75 to node 616, and then through voltage divider resistors R76, R77 to the noninverting input. The magnitude of NULL1 sets the zero point of amplifier 615. Capacitors C50, C51 filter out undesirable high frequency components.

The signal CHROMA LEVEL is also provided from the DAC 426d and through resistor R78 to node 616 for purposes of adjusting the level of the correction signal output as a function of the CHROMA level operator control. The chroma LEVEL DC input voltage is also provided through resistor R79 to the buffer circuit 470b, which is constructed in a manner similar to circuit 470a for amplifying the LAG CORRECTION signal. A similar nulling control signal NULL2 is provided through resistor R80 to the buffer circuit 470b for nulling the correction signal at zero input levels. Those skilled in the art will appreciate that the CHROMA LEVEL signal, being provided simultaneously through resistors R78, R79 to buffer amplifiers 470a, 470b respectively, causes an equal adjustment of the output voltage, as a function of the magnitude of the CHROMA LEVEL signal, by increasing or decreasing the differential voltage at the inputs of amplifier 615 in circuit 470a and a like amplifier in circuit 470b.

The outputs of the buffer amplifiers 470 are then provided to a shaping or damping networks 471, which smooth transitions between steps which may occur on the output of the correction signal video DAC 440. With particular reference to shaping network 471a in FIG. 6, it will be seen that the shaping circuit comprises a pull-down resistor R85, which pulls down the open-collector output of the amplifier 615 to the negative power supply. An RL network comprising coil L2 and load resistor R6 introduce a time constant of approximately 16 nanoseconds so that sharp transitions occurring on the output of the amplifier 615 can be smoothed.

The operation of the shaping circuit 471a is most apparent at color transitions or boundaries, wherein an image area of a different hue which requires a different correction signal is selected by the correction signal selecting circuit. If the transition between correction signals is a large voltage step, and a hue of interest lies close to the boundary between color fans, there can occur a situation wherein hues only s lightly different from the hue of interest receive a grossly different correction signal, causing the video image to produce color distortions for the hues close to the hue of interest. The phenomenon manifests itself as freckling or mottling in the image in areas which are normally expected to have smoothly transitioning hues. For example, in a video image a person's face, it would normally be expected that a wide range of reddish hues would be present. With particular reference to FIG. 5 of the referenced parent patent, assume that the color of interest lies very close to the boundary between color interval 13 and 12. If the color correction signal for fan 12 was significantly different from the correction signal for fan 13, hues in fan 12 close to the boundary between 12 and 13 would be distorted in hue from those in fan 13 near the boundary, when it would be normally expected for there to be gradually changing hues for a "blended" look across the person's face. The color distortion might appear as spots on the person's face of a slightly yellowish or orange color, and would appear quite abnormal.

With reference now to FIG. 10, the correction signal expected at the transition between 13 and 12 would be expected to be a step from correction C1 to correction C2. However, the shaping circuit 471 causes the correction voltage output to be C2' at time $T_n$, and the output C2' does not reach the full correction level C2 until a finite time period after the transition.

In a similar manner, a transition from C2 down to correction signal level C3 requires a finite time period so that hues close to the boundary between 12 and 11 do not suddenly receive a vastly different correction.

Referring again to FIG. 6, the output of the shaping circuit 471a is then provided to the input of sample-and-hold circuit 472a, where the correction signal is sampled and held in response to the SAMPLE and HOLD signals provided from the correction signal selection circuitry 455. In the second disclosed embodiment, the sample-and-hold circuits 472 are type SHM-7 manufactured by Datel Systems, Inc. of Canton, Mass. The output of the sample-and-hold circuit 472a is provided through a resistor R90 to a 7.0 MHz trap filter 620 comprising parallel-connected coil L3 and capacitor C55 for removing the sampling frequency from the correction signal, it being recalled that the signals SAMPLE and HOLD occur twice per subcarrier cycle. After the trap filter 620, the signal is provided through resistor R91 and load resistor R92 as the correction signal CSC1', which is provided to the circuitry shown in FIG. 7.

The buffer amplifiers 470b, 470c, shaping networks 471b, 471c, as well as remaining circuitry shown in FIG. 6, are constructed in a manner similar to that described with respect to formation of the correction signal CSC1', with the exception that the shaping circuit 471c for the luminance correction signal LUM CORRECTION has a greater time constant, of about 24 nanoseconds, since the bandwidth of the LUMINANCE signal is lower than that of the CHROMA signal.

CORRECTION SIGNAL COMBINING

Figure 7:
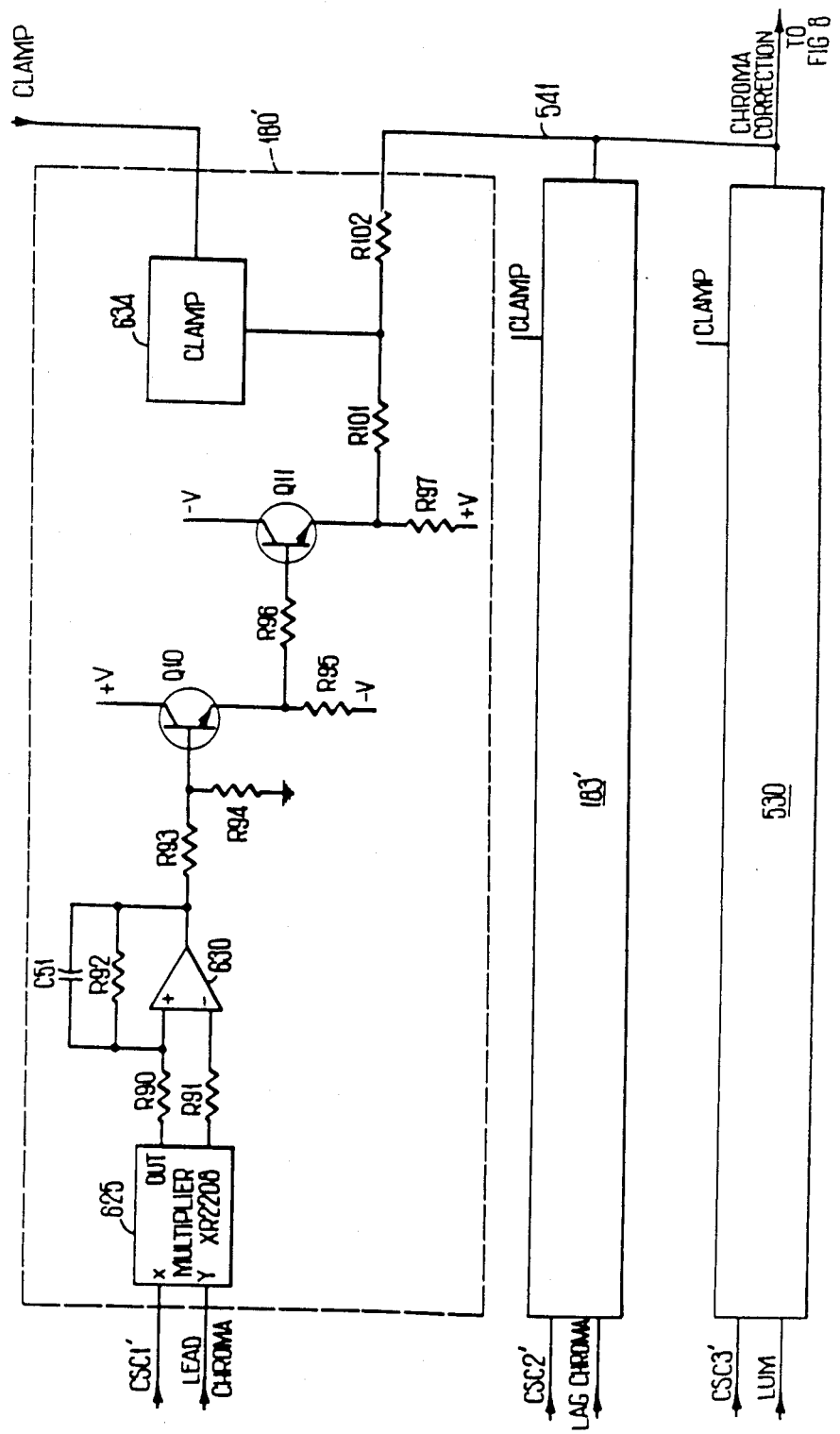
FIG. 7 is a detailed schematic diagram of the phase-leading, phase-lagging and luminance correction combining circuitry employed in the preferred embodiment of FIG. 1.

FIG. 7 illustrates the multiplier circuits 180', 183', and 530 which are responsive to multiply the LEAD CHROMA, LAG CHROMA and LUM signals by the appropriate correction signal CSC1', CSC2', CSC3', respectively. Each of the multiplier circuits 180', 183', and 530 are similarly constructed. With reference to circuit 180', the correction signal CSC1' and the respective signal to be controlled LEAD CHROMA are provided to different X and Y term inputs of a multiplier circuit 625, a type XR-2208 operational multiplier manufactured by Exar Integrated Systems, Inc. of Sunnyvale, Calif. The scale factors of the multiplier (not illustrated), which are outlined in the material provided by the manufacturer, are preset to be about 1. The output OUT of the multiplier 625 provided in the differential mode through load resistors R90, R91 to the inputs of an operational amplifier 630, a type HA5160 in the preferred embodiment. The feedback network of amplifier 630, comprising resistor R92 and capacitor C51, provide a gain of about 2.

The output of amplifier 630 is provided through base-biasing resistor R93 and load resistor R94 to the base of an NPN transistor Q10 configured as an emitter follower, with the emitter being tied through resistor R95 to the negative rail and the collector being tied to the positive rail. The signal is then provided through a base-biasing resistor R96 to the base of an NPN transistor Q11, also configured as an emitter follower, with the collector being tied to the negative rail and the emitter tied through resistor R97 to the positive rail. Transistors Q10, Q11 buffer the signal for provision to a summing junction 541, where the output of the multiplier circuit 180' is additively combined with the outputs of circuits 183' and 530. The signal from the emitter of transistor Q11 is provided through resistors R101, R102 to the node 541, where the CHROMA CORRECTION signal is formed.

A clamping circuit 634 is connected between resistors R101 and R102, and clamps the correction to zero during the presence of the CLAMP signal.

Figure 8:
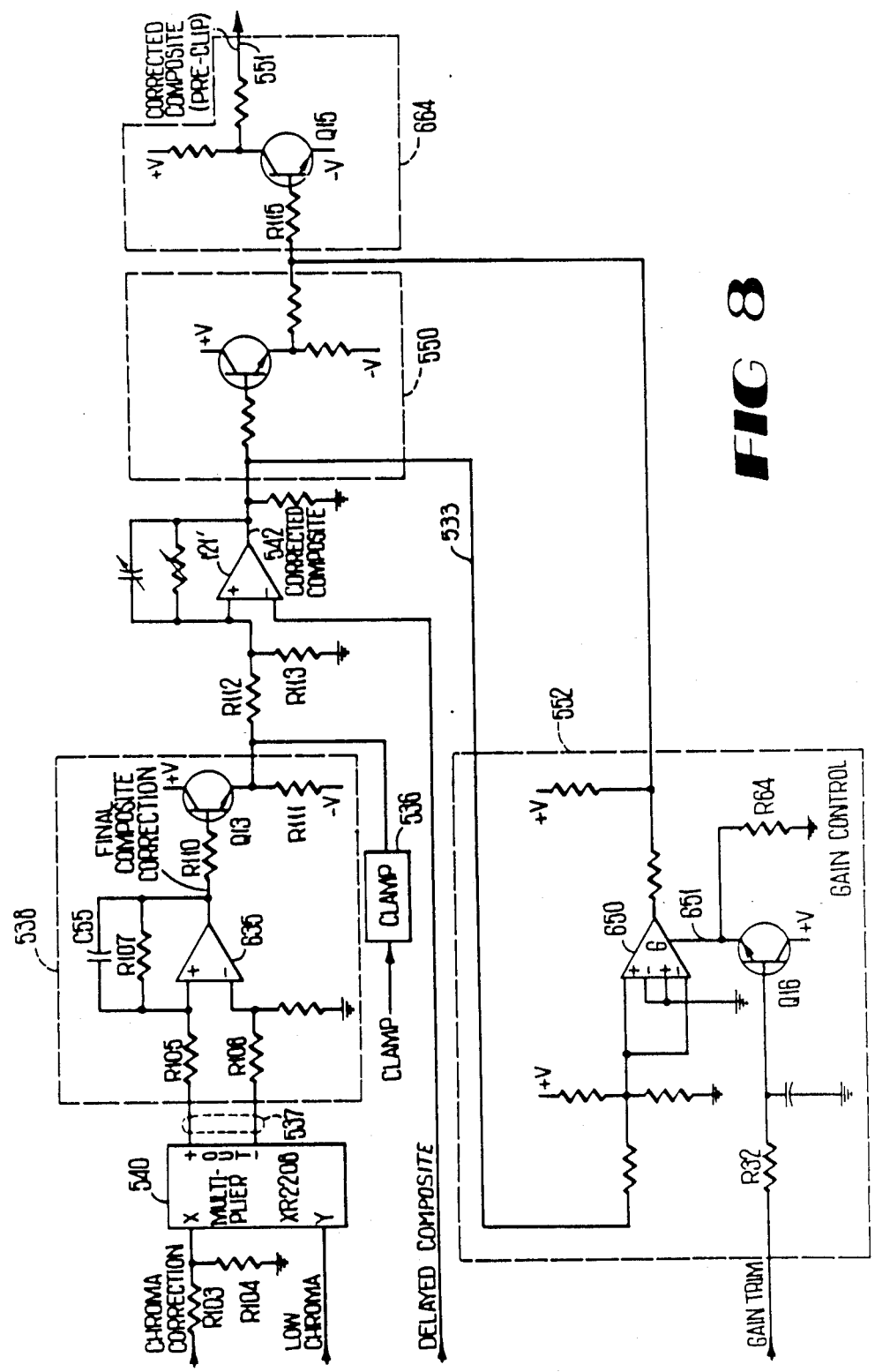
FIG. 8 is a detailed schematic diagram of circuitry employed in the preferred embodiment of FIG. 1 for combining correction signals with an uncorrected input video signal.

The CHROMA CORRECTION signal is then provided to circuitry in FIG. 8, where it is combined with the LOW CHROMA signal and then recombined with the uncorrected composite signal DELAYED CHROMA to form the corrected composite video signal. Referring now to FIG. 8, the CHROMA CORRECTION signal is provided through voltage divider resistors R103, R104 to the X term input of a type XR 2208 operational multiplier 540 while the LOW CHROMA signal, provided from the circuitry described above in connection with FIG. 2, is provided to the Y term input. The scaling network for the multiplier (not illustrated) provides a constant of about 1.

The output of multiplier 540 is provided in the differential mode on lines 537 as the FINAL COMPOSITE CORRECTION signal through resistors R105, R106 to the inputs of a buffer amplifier 538, comprising a type HA5160 amplifier 635 configured to provide unity gain with feedback network R107 and capacitor C55, which causes the response to roll off at frequencies above 3.58 MHz. The output of amplifier 635 is provided through a base-biasing resistor R110 to the base of an NPN transistor Q13 configured as an emitter follower, with the emitter being tied through resistor R111 to the negative power supply. A clamping circuit 640 clamps the output of circuit 538 to zero during the presence of the CLAMP signal.

From the emitter of emitter-follower Q13, the signal is then provided through voltage divider resistors R112, R113 to the non-inverting input of wideband amplifier 121', which operates to combine the FINAL COMPOSITE CORRECTION signal with the DELAYED CHROMA signal.

The inverting input of amplifier 121' receives the DELAYED CHROMA signal which then swings about zero volts, while the FINAL COMPOSITE CORRECTION signal additively combines with DELAYED CHROMA to result in a net phase-and/or-amplitude-adjusted output signal, which is provided on line 542 as the CORRECTED COMPOSITE signal. The signal on line 542 is, in essence, the color-corrected video signal.

The signal on line 542 is provided to an emitter follower buffer 550, configured in a manner similar to the other emitter followers described herein, which is connected in parallel with a gain control circuit 552, which receives a GAIN TRIM signal from the DAC 426c (FIG. 1A). The emitter follower circuit 550 passes the signal to the base-biasing resistor R115 of yet another emitter follower circuit 644, the output of which is the CORRECTED COMPOSITE signal on line 551, prior to clipping.

The gain control circuit 552 is employed to adjust the gain of the signal appearing on line 551 during construction of the circuit, for calibration purposes. The preferred gain control circuit comprises a two-channel input differential amplifier 650, a type MC1445 manufactured by Motorola, whose gate control input G receives on line 651 the GAIN TRIM signal after buffering by emitter follower circuit comprising NPN transistor Q16. It will be understood that the voltage on the gate control selects between an inverting or a non-inverting amplifier stage of amplifier 650, in varying degrees, to provide for about 8-10% gain trim at the input of resistor R115 at the input of emitter follower Q15.

OUTPUT CLIPPING CIRCUITS

Turning now to FIG. 9, the CORRECTED COMPOSITE signal on line 551 is next provided to a series of clipping circuits which clip portions of the signal above predetermined threshold magnitudes, as determined by settings provided from the microcomputer 50' via DAC's 426. Referring to FIG. 9, it will be seen that the signal receives luminance clipping by a soft clipping circuit 555, a luminance black clipping circuit 557 and a luminance white clipping circuit 556, which are shown generally in FIG. 1C. A 3.58 MHz trap filter 554, constructed of a parallel RLC network familiar to those skilled in the art prevents any chrominance frequency distortion from being introduced into the signal on line 551 from the clipping circuits 555, 556, 557.

The luminance black clipping circuit 557 receives the DC-control voltage LUM BLK CLIP through a base-biasing resistor R120 to the base of a PNP transistor Q20, whose collector is connected to the negative voltage supply and whose emitter is connected through resistor R121 to the positive voltage supply. The emitter is connected to the base of an NPN transistor Q21, whose collector is connected to the positive power supply and whose emitter is connected to line 654 at the input of the trap filter 554. The BLANKING signal is connected through current-limiting resistor R122 to the cathode of a diode CR2, whose anode is connected to the base of transistor Q21. It will be understood that the BLANKING signal removes the bias from the base of Q21, turning the transistor off during blanking.

The luminance white clipping circuit 556 receives the LUM WHT CLIP signal through a resistor R124 to the base of a PNP transistor Q22, whose collector is connected to the negative power supply and whose emitter is connected to the line 654. A series-connected pair of transistor-protection diodes CR8, CR9 are connected between the bases of transistors Q21, Q22 prevent both transistors from conducting simultaneously.

The soft white clipping circuit 555 receives the variable-level DC signal SOFT WHT CLIP from the DAC 426b through a resistor R125 to the base of an PNP transistor Q23, whose collector is connected to the negative voltage supply. The emitter of Q21 is connected through resistor R126, preferably about 75 ohms, to line 654. It will be appreciated that when the signal level on the line 654 is high enough (positive voltage), Q23 will conduct as a function of the base input bias provided by the SOFT WHT CLIP signal, and the voltage on line 654 will be clipped. Accordingly, it will be appreciated that portions of the video image which are predominantly white or high-luminance neutral tones can be selectively varied by varying the level of the signal SOFT WHT CLIP. The effect in the video image is to accentuate contrast between white areas or bright grey areas, and dark or shadow areas in the video image.

The effect of the luminance-affecting clipping circuits 555, 556, 557 is seen on the line 551, at the input of the composite black clipping circuit 561.

The corrected composite signal on line 551, after receiving luminance clipping, is provided to composite black clipping circuit 561. The clipping circuit 561 clips portions of the composite signal below a preset magnitude (the signal being inverted at this state, wherein black is more negative than white). The circuit 561 comprises a variable-level clipping circuit constructed with NPN transistors Q25, Q26 whose collectors are commonly tied to the positive voltage supply, and whose emitters are commonly connected to the input of composite white clipping circuit 562 and to the negative rail through resistor R132. The base of transistor Q25 receives the CORRECTED COMPOSITE signal on line 551 through resistor R130, while the base of transistor Q26 receives the variable-level DC control signal COMP BLK CLIP from the emitter of a PNP transistor Q27, whose collector is connected to the negative voltage supply and whose emitter is connected through resistor R131 to the positive voltage supply. The COMP BLK CLIP signal is provided through resistor R134, and produces a variable-level DC signal on line 660 which controls the low or black clipping level of the composite signal.

The BLANKING signal, provided through diode CR10 and current-limiting resistor R136 to the base of Q26, prevents Q26 from conducting during blanking.

The output signal of the composite black clipping circuit 561 is provided on line 662 to the input of the composite white clipping circuit 562, which operates in a manner similar to the composite black clipping circuit, except that positive portions of the signal above that set by the composite white clipping level input signal, COMP WHT CLIP, sets the positive clipping level, and transistors Q27, Q28 are PNP. The output of the composite white clipping circuit 562 is provided on line 665 to the input of output buffer 191', constructed in the conventional manner. A remotely-controllable control signal DC OFFSET is provided for controlling any offsets which may be present in the amplifier 191'. The output of amplifier 191' on line 25' is the final, completely-corrected composite videos signal, denominated CORRECTED VIDEO OUT.

CONSTANT-PHASE SATURATION CONTROL AND CONSTANT-AMPLITUDE HUE CONTROL

As discussed above in connection with FIG. 1, the second preferred embodiment of the present invention is operative to provide hue adjustments without saturation variations, and similarly to provide saturation adjustments without affecting hue. The means whereby such operation is effectuated will be described in connection with FIG. 11.

In some prior art matrix type or color separator color correctors, adjusting the hue, say from H1 to H2 in FIG. 11, results in hue H2 having an altered saturation, since adjusting the hue in such systems necessarily requires an alteration of the relative proportions of the components of the hue. For the same reason, altering the saturation of H1 frequently results in a change in the hue to H2.

In the present invention, saturation control is effectuated without altering hue (i.e., the phase angle), by providing an output vector amplitude $A_R$ modified from an initial amplitude $A_i$ (FIG. 12). Similarly, hue control is effectuated without altering saturation (i.e., the amplitude), by providing an output vector phase angle $\theta_R$ modified from an initial phase angle $\theta_c$.

In the embodiment disclosed in connection with FIG. 1, a separate hue adjustment and a separate saturation adjustment is provided for each of the different color fans or intervals. In each of these separate controls, there is provided a control knob as more particularly described in copending application Ser. No. 495,783 entitled "VIDEO SIGNAL CONTROL SYSTEM"- now U.S. Pat. No. 4,597,066, the disclosure of which is incorporated by reference herein, and which is assigned to the assignee of the present invention. Each of these control knobs provide 255 pulses for one complete rotation of the control knob. Accordingly, the microcomputer 50' in FIG. 1A is responsive to the number of pulses provided from the rotation of one of the hue or saturation control knobs to adjust the hue or saturation accordingly, without affecting the other of the controls.

It will be recalled from the discussion pertaining to the equations set forth in the referenced parent patent and the formation of the control signals CSC1 and CSC2 (which signals correspond to the signals CSC1' and CSC2' in the second embodiment), formation of the desired amplitude of the resultant corrected composite video signal $A_R$ will adjust the saturation of a selected color, while adjustment of the desired phase of the resultant corrected composite video signal, $\theta_R$, will result in a change in hue. It will be further recalled that the resultant signal, denominated for purposes of the following example as R, is an additive combination of the original input composite video signal, X, plus a correction signal C:

$$R = X + C$$

In all of the embodiments described herein, the correction signal C comprises the additive combination of a 45° leading signal and a 45° lagging signal, denominated for purposes of this example $Y_R$ and $Z_R$, so that the correction signal equation becomes:

$$R = X + C = X + (Y_R + Z_R)$$

The signals $Y_R$ and $Z_R$ are a multiplicative combination of the correction signals CSC1 and CSC2 and the quadrature component signals derived by phase-sifting the input composite signal:

$$Y_R = CSC1 \cdot Y$$

$$Z_R = CSC1 \cdot Z$$

where Y and Z are always in quadrature due to phase-shifting of the input signal. Accordingly, values of $A_R$ and $\theta_R$ defined in the equations in the referenced parent, which are the desired resultant amplitude and phase angle for the output video signal, which then can be used by the computer to derive the appropriate levels for the signals CSC1 and CSC2 according to the above equations. Thus, in the preferred embodiment, the resultant signal $A_R$ is formed according to the following equation:

$$A_R = SATPPOT \cdot SPOT + SATMIN$$

where SATPPOT = (SATMAX - SATMIN)/255
The value of SPOT is the amount of adjustment of the saturation control for the particular color interval from the saturation control knob, which varies between 0 and 255. The value of SATMIN is a constant 0.25, which represents a minimum saturation value (a percentage) below which saturation is not adjusted in the second preferred embodiment. The value of SATMAX is a constant which represents the maximum saturation value, which in the disclosed embodiment is two hundred percent of the input signal saturation.

The equation for formation of the value of $\theta_R$, which represents the hue adjustment to be made without affecting the saturation, is formed according to the following equation:

$$\theta_R = HUEPPOT \cdot HPOT + HUEMIN$$

where HUEPPOT = (HUEMAX - HUEMIN)/255
The value of HPOT is the amount of hue alteration or adjustment provided from the hue control knob, which varies from 0 to 255, as described above. The value of the maximum hue change allowable HUEMAX is a constant, in terms of degrees on the color circle, which varies from a maximum of 59°, to a minimum of −60°.

In the preferred embodiment, a table as constructed by computing CSC1 and CSC2 for all possible combinations of the hue and saturation control knobs, which comprises 256×256=64K possible values for CSC1, and likewise 64K possible values for CSC2, for a total storage requirement of 128K.

In order to achieve economies of storage, the hue adjustment is less precise than 0 to 255, so that there are only 128 (as opposed to 256) different increments of hue control. Accordingly, the storage requirements have been halved from 128K to 64K. Further savings are possible by noting that the correction signals CSC1 and CSC2 are the same in that both are quadrature related, with one being a cosine function and the other being a sine function. Accordingly, the storage requirements have been reduced from 64K to 32K by discarding half of the values, and instructing the computer 50' to perform the appropriate sine to cosine conversion prior to addressing the ROM 423. Those skilled in the art will appreciate that this conversion is approximated by providing a constant address offset in addressing ROM 423. Accordingly, it will be understood that the computer 50' supplies correction values read from ROM 423 to the ECL RAMs 430 in response to receiving an amount of adjustment to a hue control, or an amount of adjustment to a saturation control, to form a fifteen-bit index into the ROM 423, to obtain an eight-bit correction value for CSC1 or CSC2 which is stored in the ECL RAM.

It will therefore be understood that there has been described means whereby the hue in a given color window or interval may be adjusted within that interval, even crossing to another interval, without changing the saturation of the signal, and in like manner, the saturation of a selected hue within a color interval may be adjusted without undesirably affecting the hue, an improvement over prior art systems wherein an adjustment of the saturation necessarily changes certain hues due to a change in the proportions of the primary or complementary video signals.

The preferred embodiments of the present invention have been disclosed by way of example and it will be understood that other modifications may occur to those skilled in the art without departing from the scope and the spirit of the appended claims.

We claim:

1. A phase responsive video signal correction system for correcting a video parameter of an image represented by a phase encoded video signal, comprising:
   phase detecting means responsive to detect relative phase between a phase encoded component of an uncorrected video signal and a phase reference signal
   correction signal means responsive to said plane reference signal for providing a plurality of correction signals, each of said correction signals being related to a predetermined range of phase differences between said phase reference signal and said uncorrected video signal;
   means for dividing each cycle of said phase reference signal into a plurality of discrete color intervals, each of said color intervals being related to a particular one of said correction signals;
   correction signal selecting means responsive to said detected relative phase for selecting a particular one of said correction signals, said correction signal selecting means being operative to select said particular one of said correction signals twice per cycle of said phase reference signal; and
   means responsive to said selected particular one of said correction signals for correcting said uncorrected video signal to provide a color corrected video signal.

2. The system of claim 1, wherein said correction signal means comprises:
   addressable memory means for storing a plurality of said correction signals in a plurality of addressable locations;
   addressing means for addressing said memory means; and
   synchronizing means responsive to said phase reference signal for resetting said addressing means to a predetermined initial address at predetermined intervals related to said phase reference signal,
   whereby said memory means repeatedly provides said plurality of correction signals as an output each cycle of said phase reference signal.

3. The system of claim 2, wherein said memory means stores a plurality of selectable sets of said correction signals, each of said sets of correction signals corresponding to different correction inputs for said uncorrected video signal provided by an operator.

4. The system of claim 3, further comprising computer control means responsive to receive operator corrections for said uncorrected video signal from an operator control panel, and wherein said computer control means is operative to load said addressable memory with said sets of 5. The system of claim 3, wherein selection between different ones of said correction signals in said addressable memory is determined by a plurality of lower order of significance bits of said addressing means, and selection between different sets of said correction signals is determined by a higher order of significance bit of said addressing means,
   whereby selection between different sets of said correction signals is made by changing only a selected one or ones of said higher order address bits to effectuate rapid changes between sets of correction values.

6. The system of claim 1, wherein said correction signal means repeatedly provides said plurality of correction signals in synchronization with said phase reference signal, wherein said phase encoded video signal is a chrominance signal, and wherein said correction signal selecting means comprises:
   chroma detect signal means for providing a chroma detect signal in response to said chrominance signal exceeding a predetermined magnitude;
   correction signal holding means responsive to said chroma detect signal for holding the magnitude of a particular one of said plurality of correction signals being provided by said correction signal means.

7. The system of claim 1, further comprising damping means for smoothing transitions between selected particular ones of said correction signals,
   whereby a correction for said video signal corresponding to one range of hues changes over time to a correction for a subsequent range of hues to reduce color freckling in the video image.

8. The system of claim 1, wherein said phase encoded video signal is a chrominance signal, and further comprising:
   chrominance level detecting means for providing a low chroma signal in response to detection of the chrominance signal below a predetermined threshold magnitude; and
   means responsive to said low chroma signal for selectively varying said selected particular one of said correction signals,
   whereby correction to said uncorrected video signal may be selectively reduced at low chroma levels.

9. The system of claim 1, further comprising means for shifting the effective phase of said phase reference signal to alter said detected relative phase,
   whereby a selected particular one of said correction signals related to a particular predetermined range of phase differences can be applied to a portion of a different range of phase differences to shift the center of the effective correction window.

10. A phase responsive video signal correction system for correcting a video parameter of an image represented by an uncorrected phase-encoded input video signal, comprising:
    addressable memory means for storing a plurality of correction signals in a plurality of addressable locations, each of said correction signals being related to a predetermined range of phase differences between a phase reference signal and said uncorrected video signal;

counter means for addressing said memory means;

synchronizing means responsive to said phase reference signal for resetting said counter means to a predetermined initial address at predetermined intervals related to said phase reference signal such that said memory means repeatedly provides said plurality of correction signals as an output each cycle of said phase reference signal;

control means responsive to receive operator corrections for said uncorrected video signal from an operator control panel, said control means being operative to load said addressable memory with correction signals corresponding to operator corrections;

chroma detect signal means for providing a chroma detect signal in response to said input video signal, said chroma detect signal being related to the phase difference between said input video signal and said phase reference signal;

correction signal selecting means responsive to said chroma detect signal for selecting a particular one of said correction signals twice per cycle of said phase reference signal by holding the magnitude of a particular one of said plurality of correction signals being provided by said memory means; and means responsive to said selected particular one of said correction signals for correcting said uncorrected video signal to provide a color corrected video signal.

11. The system of claim 10, wherein said memory means stores a plurality of selectable sets of said correction signals, each of said sets of correction signals corresponding to different correction inputs for said uncorrected video signal provided by an operator.

12. The system of claim 10, further comprising addressing means for addressing said sets of correction signals in said memory means, and wherein selection between different ones of said correction signals in said addressable memory is determined by a plurality of lower order of significance bits of said counter means, and selection between different sets of said correction signals is determined by at least one higher order of significance bit of said addressing means, whereby selection between different sets of said correction signals is made by changing only a selected one or ones of said higher order address bits to effectuate rapid changes between sets of correction values.

13. The system of claim 10, further comprising damping means for smoothing transitions between selected particular one of said correction signals, whereby a correction for said video signal corresponding to one range of hues changes over time to a correction for a subsequent range of hues to reduce color freckling in the video image.

14. A phase responsive video parameter correction system for correcting a video parameter of a portion of a video image represented by a phase-encoded video signal, said portion of said video image being at least partially defined by a predetermined hue, comprising:

phase detecting means responsive to said phase-encoded video signal operative to detect said predetermined hue by detecting relative phase between said phase-encoded video signal and a reference signal and to provide a chroma detect signal related to said predetermined hue twice each cycle of said phase-encoded video signal;

correction signal means responsive to said chroma detect signal for providing a correction signal related to a desired value of a video parameter for said predetermined hue twice each cycle of said phase-encoded video signal; and means responsive to said correction signal for correcting said video parameter to said desired value.

15. The system of claim 14, wherein said video parameter is the hue of said portion of said video image.

16. The system of claim 14, wherein said video parameter is the saturation of said portion of said video image.

17. The system of claim 14, wherein said video parameter is the luminance of said portion of said video image.

18. The system of claim 14, further comprising memory means for storing a plurality of correction signals, each of said plurality of correction signals being related to a different predetermined hue, and wherein said correction signal means selects a particular one of said plurality of correction signals stored in said memory means related to a particular predetermined hue.

19. The system of claim 18, wherein said memory means is an addressable digital memory, wherein said correction signals are digital signals, and wherein said chroma detect signal selects a particular address of said addressable memory to select said particular one of said correction signals.

20. The system of claim 14, wherein said video parameter is the hue of said portion of said video image, and further comprising:

quadrature signal means for converting said phase-encoded video signal into a pair of quadrature-related chrominance component signals, quadrature signal correction means responsive to said correction signal for modifying the amplitude of at least one of said chrominance component signals to provide a modified chrominance component signal, and quadrature component signal mixing means for mixing said modified chrominance component signal with the other one of said chrominance component signals to provide a phase-shifted phase-encoded video signal.

21. The system of claim 20, wherein said quadrature signal correction means comprises analog multiplier means.

22. The system of claim 20, wherein said quadrature signal means comprises phase shifting means responsive to shift said phase-encoded video signal by ninety degrees to provide one of said pair of quadrature-related chrominance component signals.

23. The system of claim 14, wherein said phase-encoded video signal is a composite video signal including a luminance signal and a chrominance signal, and further comprising filter means for separating said chrominance signal from said composite video signal and for providing said chrominance signal to said phase detecting means.

24. The system of claim 14, wherein said correction signal means comprises:

addressable memory means for storing a plurality of said correction signals; and digital address counter means for addressing said memory means, said address counter means being responsive to count to a predetermined count at least once each cycle of said reference signal, said address counter means being reset to a predetermined nominal count at least once each cycle of said reference signal.

25. The system of claim 24, wherein said correction signal means further comprises:
latching means responsive to said chroma detect signal for latching and holding a digital count of said address counter means to select one of said stored correction signals at a time of occurrence of said chroma detect signal, said digital count representing a value related to said predetermined hue of said video image.

26. The system of claim 24, wherein said phase detecting means further comprises phase locked loop means for locking to the frequency of said reference signal 27. The system of claim 26, wherein said phase locked loop means includes an oscillator having an output frequency greater than the frequency of said reference signal, and further comprising second digital counter means responsive to an output signal of said oscillator to count to a predetermined count at least once each cycle of said reference signal,
said address counter means being responsive to count upon each occurrence of a first particular output signal from said second digital counter means and to reset upon each occurrence of a second particular output signal from said second digital counter means,
whereby said address counter divides each cycle of said reference signal into a plurality of discrete intervals, each of said intervals being related to a particular one of a plurality of desired values of said video parameter.

28. The system of claim 27, further comprising latching means responsive to said chroma detect signal for holding a count of said address counter to select a particular one of said plurality of discrete intervals, whereby a particular one of said plurality of desired values of said video parameter is selected 29. The system of claim 24, wherein said correction signal means further comprises:
conversion means for converting said correction signals stored in said memory means into analog correction signals, and
sample and hold means responsive to said chroma detect signal for holding the magnitude of said analog correction signal for said correcting means.

30. A phase responsive video signal correction system for correcting a video parameter of an image represented by an uncorrected input color video signal, comprising:
phase detecting means responsive to detect relative phase between a phase encoded component of said uncorrected input video signal and a reference signal in each one of a plurality of ranges of phases representable by said input video signal;
means for adjusting the phase of said reference signal so as to adjust the relative boundaries of said plurality of ranges of phases;
correction signal means responsive to said detected relative phase for generating a correction signal related to said detected relative phase; and
means responsive to said correction signal for correcting said uncorrected input video signal to provide a corrected video output signal.

31. A color video signal correction apparatus, comprising:
means for applying a first correction to a video parameter when said video parameter corresponds to a first range of phases representable by an input video signal;
means for applying a second correction to said video parameter when said video parameter corresponds to a second range of phases representable by said input video signal;
means for smoothing transitions between said first correction and said second correction so that when said first correction differs significantly from said second parameter, said video parameter does not experience a relatively larger differential correction,
whereby said video parameter for phases close to the boundary between said first range of phases and said second range of phases experiences a gradual transition from said first correction to said second correction.

32. The apparatus of claim 31, wherein said video parameter is hue.

33. The apparatus of claim 31, wherein said smoothing means comprises reactive circuit having a predetermined time constant of about 16 nanoseconds.

34. A phase responsive video signal correction system for correcting a video parameter of an image represented by a phase encoded vide signal, comprising:
phase detecting means responsive to detect relative phase between a phase encoded component of an uncorrected video signal and a phase reference signal;
correction signal means responsive to said phase reference signal for providing a plurality of correction signals, each of said correction signals being related to a predetermined range of phase differences between said phase reference signal and said uncorrected video signal;
correction signal selecting means responsive to said detected relative phase for selecting a particular one of said correction signals;
damping means for smoothing transitions between selected particular ones of said correction signals; and
means responsive to said selected particular one of said correction signals for correcting said uncorrected video signal to provide a color corrected video signal,
whereby a correction for said video signal corresponding to one range of hues relatively gradually changes to a correction for a subsequent range of hues to reduce color freckling in the video image.

35. The video signal correction system of claim 34, wherein said correcting means corrects the hue of said uncorrected video signal.

36. The video signal correction system of claim 34, wherein said damping means comprises a reactive circuit having a predetermined time constant.

37. The video signal correction system of claim 36, wherein said predetermined time constant is about 16 nanoseconds.

38. The system of claim 34, wherein said correction signal means comprises:
addressable memory means for storing a plurality of said correction signals in a plurality of addressable locations;

addressing means for addressing said memory means; and synchronizing means responsive to said phase reference signal for resetting said addressing means to a predetermined initial address at predetermined intervals related to said phase reference signal, whereby said memory means repeatedly provides said plurality of correction signals as an output each cycle of said phase reference signal.

39. The system of claim 319, wherein said memory means stores a plurality of selectable sets of said correction signals, each of said sets of correction signals corresponding to different correction inputs for said uncorrected video signal provided by an operator 40. The system of claim 420, further comprising computer control means responsive to receive operator corrections for said uncorrected video signal from an operator control panel, and wherein said computer control means is operative to load said addressable memory with said sets of correction signals.

41. The system of claim 39, wherein selection between different ones of said correction signals in said addressable memory is determined by a plurality of lower order of significant bits of said addressing means, and selection between different sets of said correction signals is determined by a higher order of significance bit of said addressing means, whereby selection between different sets of said correction signals is made by changing only a selected one or ones of said higher order address bits to effectuate rapid changes between sets of correction values.

42. The system of claim 34, wherein said phase reference signal is a video subcarrier signal, and further comprising:

means for dividing each cycle of said subcarrier signal into a plurality of discrete color intervals, each of said color intervals being related to a particular one of said correction signals; and wherein said correction signal selecting means is responsive to select said particular one of said correction signals twice per subcarrier cycle.

43. The system of claim 34, wherein said correction signals means repeatedly provides said plurality of correction signals in synchronization with said phase reference signal, wherein said phase encoded video signal is a chrominance signal, and wherein said correction signal selecting means comprises:

chroma detect signal means for providing a chroma detect signal in response to said chrominance signal exceeding a predetermined magnitude;

correction signal holding means responsive to said chroma detect signal for holding the magnitude of a particular one of said plurality of correction signals being provided by said correction signal means.

44. The system of claim 34, wherein said phase encoded video signal is a chrominance signal, and further comprising:

chrominance level detecting means for providing a low chroma signal in response to detection of the chrominance signal below a predetermined threshold magnitude; and means responsive to said low chroma signal for selectively varying said selected particular one of said correction signals.

whereby correction to said uncorrected video signal may be selectively reduced at low chroma levels.

45. The system of claim 34, further comprising means for shifting the effective phase of said phase reference signal to alter said detected relative phase, whereby a selected particular one of said correction signals related to a particular predetermined range of phase differences can be applied to a portion of a different range of phase differences to shift the center of the effective correction window.

46. A phase responsive video signal correction system for correcting a video parameter of an image represented by an uncorrected phase-encoded input video signal, comprising:

addressable memory means for storing a plurality of correction signals in a plurality of addressable locations, each of said correction signals being related to a predetermined range of phase differences between a phase reference signal and said uncorrected video signal;

counter means for addressing said memory means;

synchronizing means responsive to said phase reference signal for resetting said counter means to a predetermined initial address at predetermined intervals related to said phase reference signal such that said memory means repeatedly provides said plurality of correction signals as an output each cycle of said phase reference signal;

control means responsive to receive operator correction for said uncorrected video signal from an operator control panel, said control means being operative to load said addressable memory with correction signals corresponding to operator corrections;

chroma detect signal means for providing a chroma detect signal in response to said input video signal, said chroma detect signal being related to the phase difference between said input video signal and said phase reference signal;

correction signal selecting means responsive to said chroma detect signal for selecting a particular one of said correction signals by holding the magnitude of a particular one of said plurality of correction signals being provided by said memory means; an damping means for smoothing transitions between selected particular ones of said correction signals; and means responsive to said selected particular ones of said correction signals for correcting said uncorrected video input signal to provide a color corrected video signal, whereby a correction for said video signal corresponding to one range of hues generally changes to a correction for a subsequent range of hues to reduce color freckling in the video image.

47. The system of claim 46, wherein said memory means stores a plurality of selectable sets of said correction signals, each of said sets of correction signals corresponding to different correction inputs for said uncorrected video signal provided by an operator.

48. The system of claim 46, further comprising addressing means for addressing said sets of correction signals in said memory means, and wherein selection between different ones of said correction signals in said addressable memory is determined by a plurality of lower order of significance bits of said counter means, and selection between different sets of said correction signals is determined by at least one higher order of significance bit of said addressing means, whereby selection between different sets of said correction signals is made by changing only a selected one or ones of said higher order address bits to effectuate rapid changes between sets of correction values.

49. The system of claim 46, wherein said correction signal selecting means is responsive to select said particular one of said correction signals twice per cycle of said phase reference signal.

50. The system of claim 46, wherein said correcting means corrects the hue of said uncorrected video signal.

51. The system of claim 46, wherein said damping means comprises a reactive circuit having a predetermined time constant.

52. The system of claim 51, wherein said predetermined time constant is about 16 nanoseconds.

53. A phase responsive video signal correction system for correcting a video parameter of an image represented by a phase encoded video signal, comprising:
  phase detecting means responsive to detect relative phase between a phase encoded component of an uncorrected video signal and a phase reference signal;
  correction signal means responsive to said phase reference signal for providing a plurality of correction signals, each of said correction signals being related to a redetermined range of phase differences between said phase reference signal and said uncorrected video signal;
  correction signal selecting means responsive to said detected relative phase for selecting a particular one of said correction signals;
  means responsive to said selected particular one of said correction signals for correcting said uncorrected video signal to provide a color corrected video signal; and
  means for shifting the effective phase of said phase reference signal to alter said detected relative phase,
  whereby a selected particular one of said correction signals related to a particular predetermined range of phase differences can be applied to a portion of a different range of phase differences to shift the center of the effective correction window.

54. The system of claim 53, wherein said correction signal means comprises:
  addressable memory means for storing a plurality of said correction signals in a plurality of addressable locations;
  addressing means for addressing said memory means; and
  synchronizing means responsive to said phase reference signal for resetting said addressing means to a predetermined initial address at predetermined intervals related to said phase reference signal,
  whereby said memory means repeatedly provides said plurality of correction signals as an output each cycle of said phase reference signal.

55. The system of claim 54, wherein said memory mean stores a plurality of selectable sets of said correction signals, each of said sets of correction signals corresponding to different correction inputs for said uncorrected video signal provided by an operator.

56. The system of claim 55, further comprising computer control means responsive to receive operator corrections for said uncorrected video signal from an operator control panel, and wherein said computer control means is operative to load said addressable memory with said sets of correction signals.

57. The system of claim 55, wherein selection between different ones of said correction signals in said addressable memory is determined by a plurality of lower order of significance bits of said addressing means, and selection between different sets of said correction signals is determined by a higher order of significance bit of said addressing means,
  whereby selections between different sets of said correction signals is made by changing only a selected one or ones of said higher order address bits to effectuate rapid changes between sets of correction values.

58. The system of claim 53, wherein said phase reference signal is a video subcarrier signal, and further comprising:
  means for dividing each cycle of said subcarrier signal into a plurality of discrete color intervals, each of said color intervals being related to a particular one of said correction signals; and
  wherein said correction signal selecting means is responsive to select said particular one of said correction signals twice per subcarrier cycle.

59. The system of claim 53, wherein said correction signal means repeatedly provides said plurality of correction signals in synchronization with said phase reference signal, wherein said phase encoded video signal is a chrominance signal, and wherein said correction signal selecting means comprises:
  chroma detect signal means for providing a chroma detect signal in response to said chrominance signal exceeding a predetermined magnitude;
  correction signal holding means responsive to said chroma detect signal for holding the magnitude of a particular one of said plurality of correction signals being provided by said correction signal means.

60. The system of claim 53, further comprising damping means for smoothing transitions between selected particular ones of said correction signals.
  whereby a correction for said video signal corresponding to one range of hues changes over time to a correction for a subsequent range of hues to reduce color freckling in the video image.

61. The system of claim 53, wherein said phase encoded video signal is a chrominance signal, and further comprising:
  chrominance level detecting means for providing a low chroma signal in response to detection of the chrominance signal below a predetermined threshold magnitude; and
  means responsive to said low chroma signal for selectively varying said selected particular one of said correction signals,
  whereby correction to said uncorrected video signal may be selectively reduced at low chroma levels.

* * * * *